(12) United States Patent
Harris et al.

(10) Patent No.: US 10,940,801 B1
(45) Date of Patent: Mar. 9, 2021

(54) ACTUATING DEVICE FOR A COMPONENT

(71) Applicant: MOTHERSON INNOVATIONS COMPANY LIMITED, London (GB)

(72) Inventors: Tom Harris, Gosport (GB); David Kershaw, Fareham (GB); Gareth Aspden, Fareham (GB); Levente Kurti, Hedge End (GB)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/564,114

(22) Filed: Sep. 9, 2019

(51) Int. Cl.
| | | |
|---|---|---|
| *B60R 1/076* | (2006.01) | |
| *B60R 1/074* | (2006.01) | |
| *F16D 11/14* | (2006.01) | |
| *F16H 1/20* | (2006.01) | |
| *F16D 7/00* | (2006.01) | |

(52) U.S. Cl.
CPC ............. *B60R 1/076* (2013.01); *B60R 1/074* (2013.01); *F16D 7/00* (2013.01); *F16D 11/14* (2013.01); *F16H 1/203* (2013.01)

(58) Field of Classification Search
None
See application file for complete search history.

(56) References Cited

U.S. PATENT DOCUMENTS

| | | | |
|---|---|---|---|
| 7,093,946 B2 | 8/2006 | Barve et al. | |
| 8,764,205 B2 | 7/2014 | Sakata | |
| 8,955,992 B2 | 2/2015 | Van Zuijlen et al. | |
| 9,470,273 B2 | 10/2016 | Lang et al. | |
| 9,987,987 B2 | 6/2018 | Van Stiphout et al. | |
| 10,077,001 B2 | 9/2018 | Casals et al. | |
| 2007/0295134 A1* | 12/2007 | Krueger | B60R 1/074 74/425 |
| 2017/0232900 A1* | 8/2017 | Fuchs | F16H 1/203 359/841 |
| 2017/0232901 A1 | 8/2017 | Schadler | |
| 2018/0105112 A1 | 4/2018 | Motomiya et al. | |
| 2018/0178728 A1 | 6/2018 | Wan et al. | |

FOREIGN PATENT DOCUMENTS

| | | |
|---|---|---|
| CN | 202656933 | 1/2013 |
| EP | 0967118 | 9/2004 |
| EP | 2230131 | 5/2011 |

(Continued)

*Primary Examiner* — Colby M Hansen
(74) *Attorney, Agent, or Firm* — Jones Day

(57) ABSTRACT

An actuating device for a component includes a shaft, a housing, a clutch ring, a drive gear, and a motor drive engaged with the housing and drivably coupled to the drive gear. The shaft includes a plurality of detent teeth. The housing is movably disposed around the shaft and is coupled to the component. The housing includes a plurality of tabs. The clutch ring is movably disposed around the shaft, and includes a plurality of cam surfaces, a plurality of engagement grooves and a plurality of detent recesses. Each tab of the housing is configured to be at least partially and removably received within a corresponding engagement groove. Each detent recess is configured to releasably engage with a corresponding detent tooth. The drive gear is movably disposed around the shaft and includes a plurality of cam followers. Each cam follower is configured to travel on a corresponding cam surface.

20 Claims, 14 Drawing Sheets

(56) References Cited

FOREIGN PATENT DOCUMENTS

| | | |
|---|---|---|
| EP | 2436559 | 4/2012 |
| EP | 2639110 | 9/2013 |
| EP | 2639111 | 7/2015 |
| WO | 2003086816 | 10/2003 |
| WO | 2017074193 | 5/2018 |

* cited by examiner

ACTUATING DEVICE FOR A COMPONENT

TECHNICAL FIELD

The present disclosure relates generally to actuating devices, and more specifically to actuating devices for components used in vehicles.

BACKGROUND

Vehicles include one or more components that have to be rotated relative to a vehicle body. Such components may include mirrors and cameras. Electromechnical actuators are typically used to rotate the components relative to the vehicle body. Existing electromechanical actuators may be noisy, heavy and large in size. These electromechanical actuators often require high strength metallic parts (e.g., gearing) due to high shock loads acting on a gear train during impacts, thereby making the actuators heavier and costlier.

SUMMARY

In one aspect, the present disclosure provides an actuating device for a component. The actuating device includes a shaft, a housing, a clutch ring, a drive gear and a motor drive. The shaft includes a plurality of detent teeth. The shaft defines a longitudinal axis along a length thereof. The housing is movably disposed around the shaft and is coupled to the component. The housing includes a plurality of tabs disposed on an inner surface of the housing. The clutch ring is received within the housing and is movably disposed around the shaft. The clutch ring includes a plurality of cam surfaces, a plurality of engagement grooves and a plurality of detent recesses. Each tab of the housing is configured to be at least partially and removably received within a corresponding engagement groove from the plurality of engagement grooves in order to rotationally lock the housing relative to the clutch ring. Each detent recess is configured to releasably engage with a corresponding detent tooth from the plurality of detent teeth in order to rotationally lock the clutch ring relative to the shaft. The drive gear is received within the housing and is movably disposed around the shaft. The drive gear includes a plurality of cam followers. Each cam follower is configured to travel on a corresponding cam surface from the plurality of cam surfaces. The motor drive is drivably coupled to the drive gear. The motor drive is engaged with the housing such that rotational and translational movements of the motor drive causes corresponding rotational and translational movements of the housing. In a first position of the housing, each tab is at least partially received within the corresponding engagement groove and each detent recess is engaged with the corresponding detent tooth. The motor drive is configured to provide power output in a first rotational direction at the first position of the housing. In response to power output in the first rotational direction, the drive gear rotates with respect to the shaft such that each cam follower travels on the corresponding cam surface causing the motor drive and the housing to move away from the clutch ring along the longitudinal axis. A movement of the housing away from the clutch ring causes each tab to disengage from the corresponding engagement groove and allows rotation of the housing along with the motor drive to a second position.

In an example, the clutch ring may further include a plurality of hard stops corresponding to the plurality of cam surfaces. Each hard stop may be disposed between two adjacent cam surfaces. Each cam follower may be configured to engage with a corresponding hard stop from the plurality of hard stops. The motor drive may be configured to cease power output in response to the engagement of each cam follower with the corresponding hard stop.

In an example, the clutch ring may further include a plurality of soft detents corresponding to the plurality of cam surfaces. Each soft detent may be disposed on the corresponding cam surface proximal to the corresponding hard stop.

In an example, in response to a movement of the component at the second position of the housing, each cam follower may be configured to travel over the corresponding hard stop to allow the housing to move to the first position.

In an example, the clutch ring may further include a plurality of engagement ledges corresponding to the plurality of engagement grooves. Each engagement ledge may be disposed adjacent to the corresponding engagement groove.

In an example, the motor drive may be further configured to provide power output in a second rotational direction opposite to the first rotational direction at the second position of the housing. In response to power output in the second rotational direction, the housing along with the motor drive may rotate from the second position such that each tab is aligned with the corresponding engagement groove. Upon alignment of each tab with the corresponding engagement groove, the drive gear may rotate with respect to the shaft to move the housing to the first position.

In an example, in response to an impact on the component at the first position of the housing, each detent recess may be configured to disengage from the corresponding detent tooth to allow the housing and the clutch ring to move together along with the component.

In an example, the motor drive may be further configured to move the housing to the first position after movement of the component.

In an example, the actuating device may further include a retaining ring disposed around the shaft. The retaining ring may include a plurality of protrusions configured to engage with the shaft. The actuating device may further include a first spring disposed between the retaining ring and the clutch ring. In an example, the first spring may be a coiled wire spring or a wave spring.

In an example, the actuating device may further include a second spring disposed between the clutch ring and the housing. The second spring may be coupled to the housing. In an example, the second spring may be a plate spring.

In an example, the housing may include a first housing part and a second housing part coupled to the first housing part. The second housing part may include the plurality of tabs.

In an example, the motor drive may include a motor and a worm gear arrangement driven by the motor. The worm gear arrangement may be drivably coupled with the drive gear.

In an example, the shaft may further include a locking ring coupled to the shaft. The locking ring may include the plurality of detent teeth.

In an example, the component is movable with respect to a vehicle between an unfolded position and a folded position. The shaft may be coupled to the vehicle. The first position of the housing may correspond to the unfolded position of the component. The second position of the housing may correspond to the folded position of the component.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the disclosure is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the disclosure. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," "downward," "upward," "downwards,", "upwards,", "forward," "reverse," "raise," "lift," "drop," are used in the description for clarity and are not intended to limit the scope of the disclosure or the appended claims. Further, it should be understood that any one of the features can be used separately or in combination with other features. Other systems, methods, features, and advantages of the disclosure will be or become apparent to one with skill in the art upon examination of the detailed description. It is intended that all such additional systems, methods, features, and advantages be included within this description, be within the scope of the present disclosure, and be protected by the accompanying claims.

Figure 1:
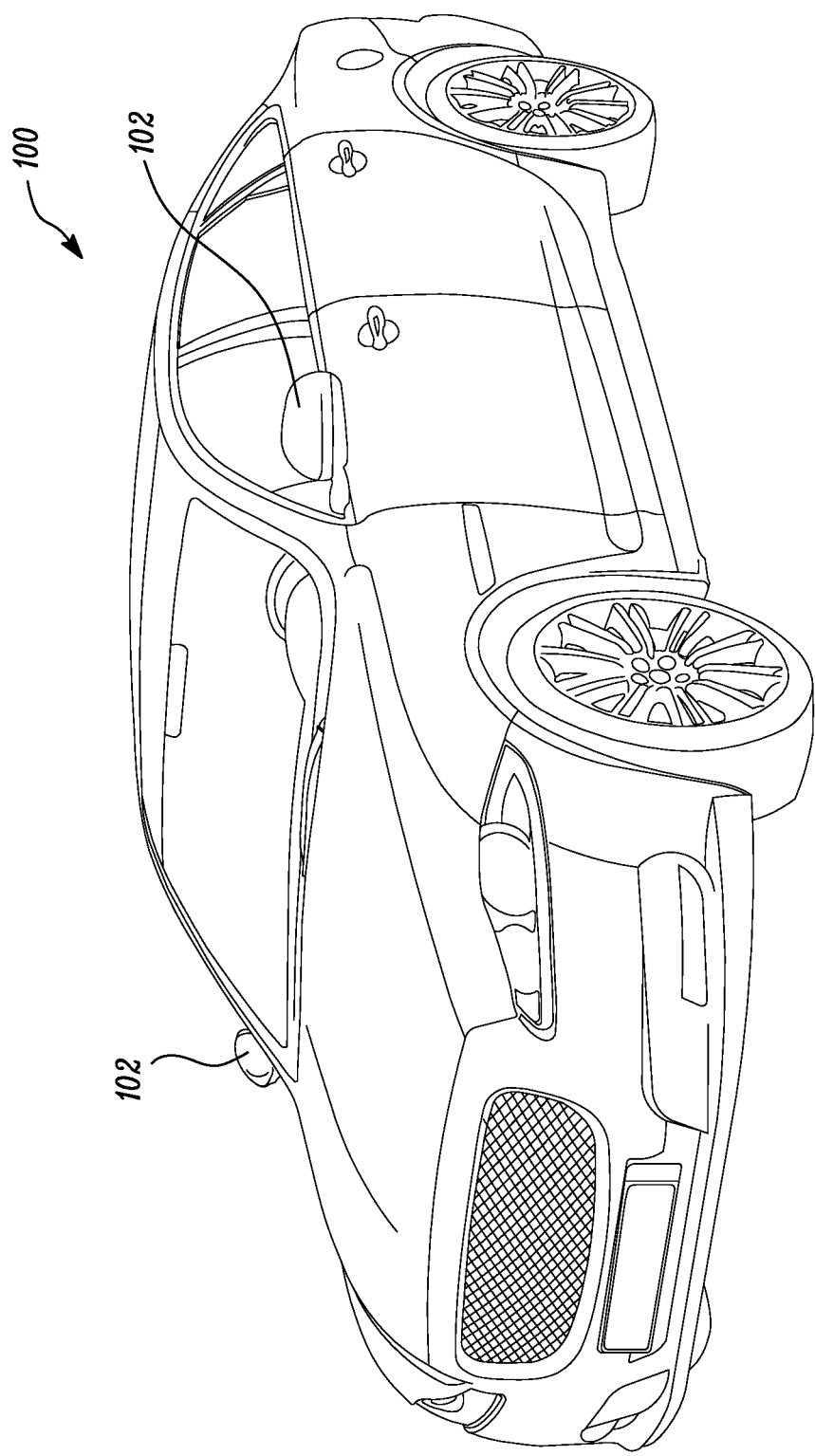
FIG. 1 is a perspective view of an example of a vehicle.

Referring now to the Figures, FIG. 1 illustrates an example of a vehicle 100. A component 102 is disposed on the vehicle 100. Although the vehicle 100 is illustrated as a passenger car in FIG. 1, the component 102 may be used with other types of vehicles, for example, buses, trucks, off-road vehicles, motorcycles, aircrafts, bicycles, trams, locomotives, heavy-duty vehicles used in construction and earthworking, and so forth.

In the illustrated example, the component 102 is a side view mirror. In alternative examples, the component 102 may be a camera monitoring system. The component 102 is disposed externally on the vehicle 100 at one side. In the illustrated example of FIG. 1, the vehicle 100 includes two components 102, one on each side of the vehicle 100. The component 102 may be disposed near an A-pillar of the vehicle 100. Further, the component 102 may be adjustably mounted on the side of the vehicle 100, for example, on a door, on a fender, and so forth. In other examples, the component 102 may be provided at any location on the vehicle 100, for example, a rear of the vehicle 100, a front of the vehicle 100, and so forth. The component 102 may be provided with manual and/or automated adjustment in one or more directions, for example, vertical, horizontal and/or pivotal adjustments. The component 102 may further include one or more turn signal indicators. The component 102 may help a driver to view areas disposed behind and to the side of the vehicle 100. When aligned properly, the component 102 may enable the driver to view areas in a blind spot.

Figure 2B:
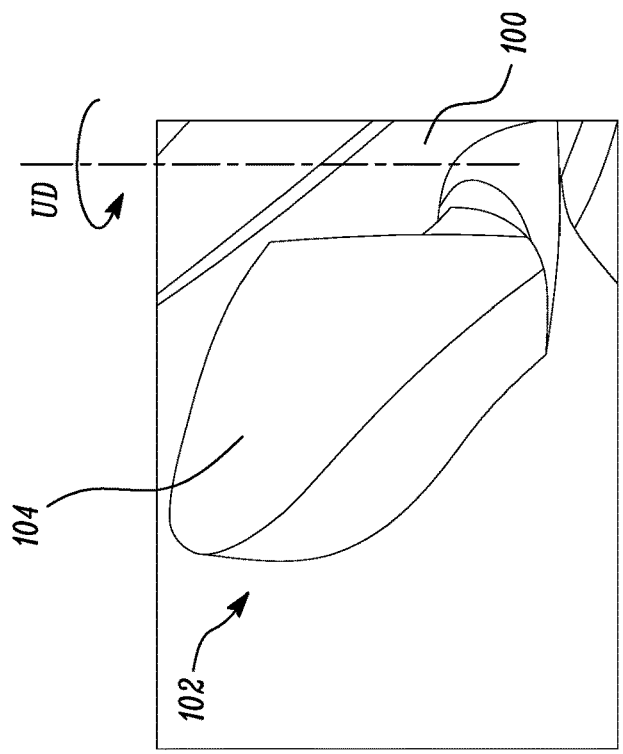
FIGS. 2A and 2B are perspective views of an example of a component of the vehicle in unfolded and folded positions, respectively.
Figure 2A:
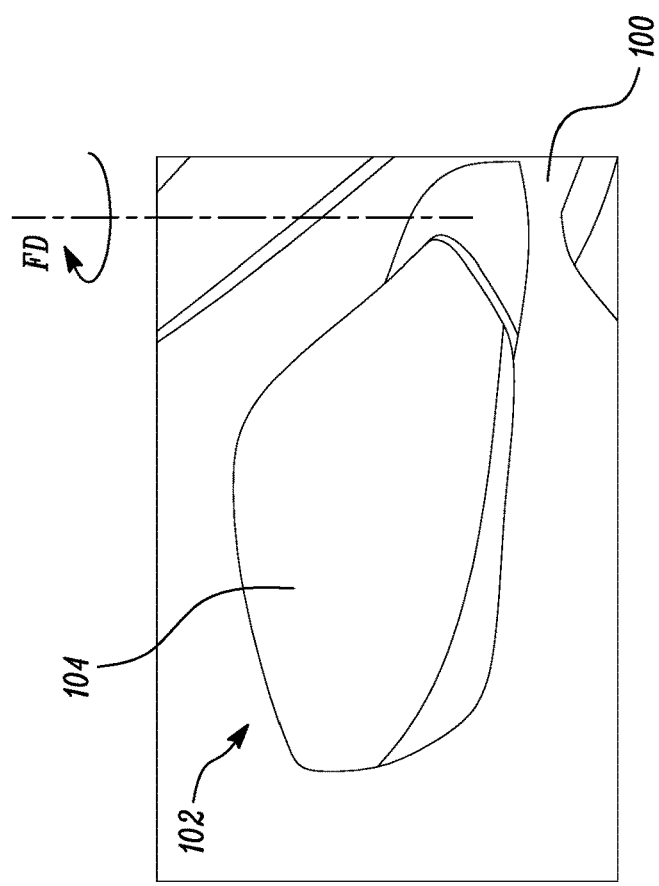

As shown in FIGS. 2A and 2B, the component 102 is movable with respect to the vehicle 100 between a unfolded position and a folded position. As shown in FIG. 2A, the unfolded position is a drive position of the component 102 where the component 102 is disposed away from the vehicle 100. As shown in FIG. 2B, the folded position may be a park position of the component 102 where the component 102 is folded towards the vehicle 100.

Figure 3B:
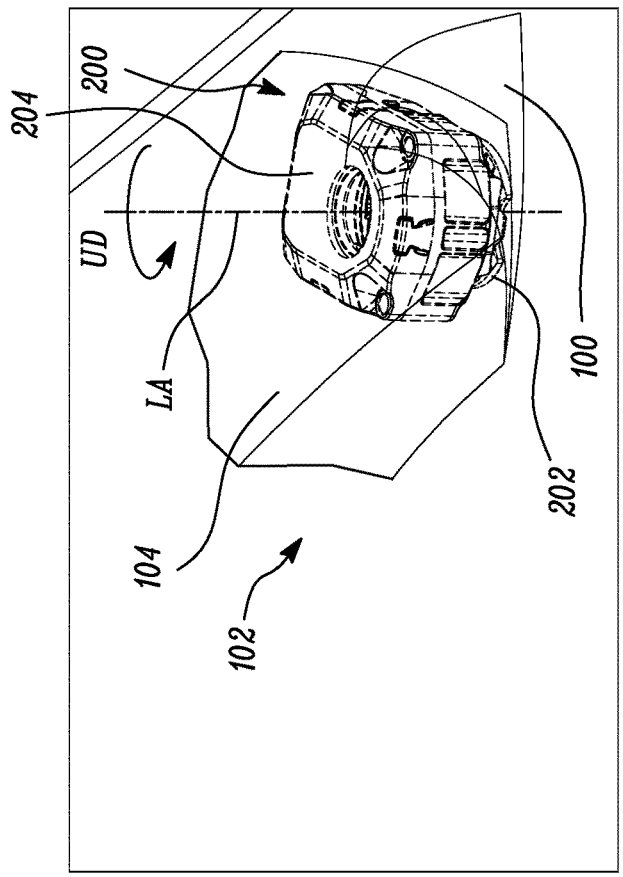
FIGS. 3A and 3B are perspective views of an example of an actuating device coupled to the component in first and second positions, respectively.
Figure 3A:
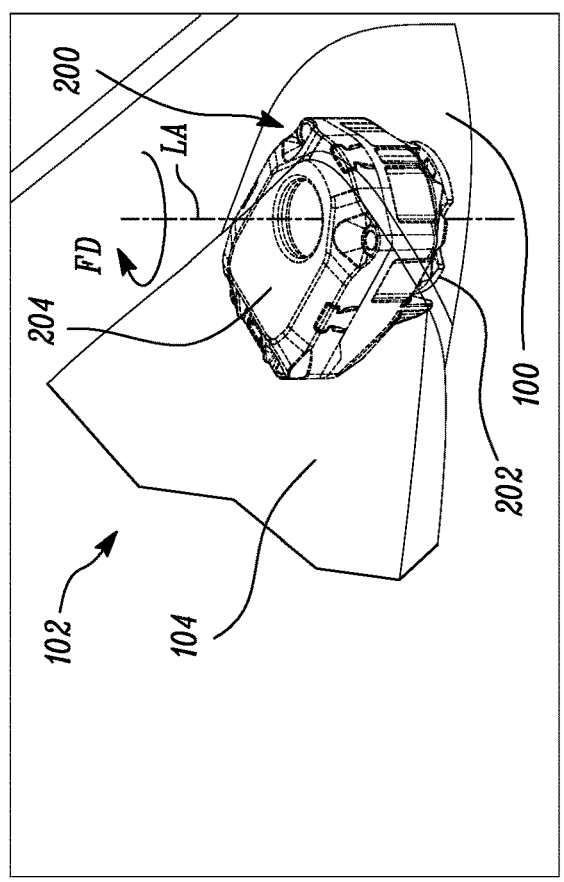
Figure 4:
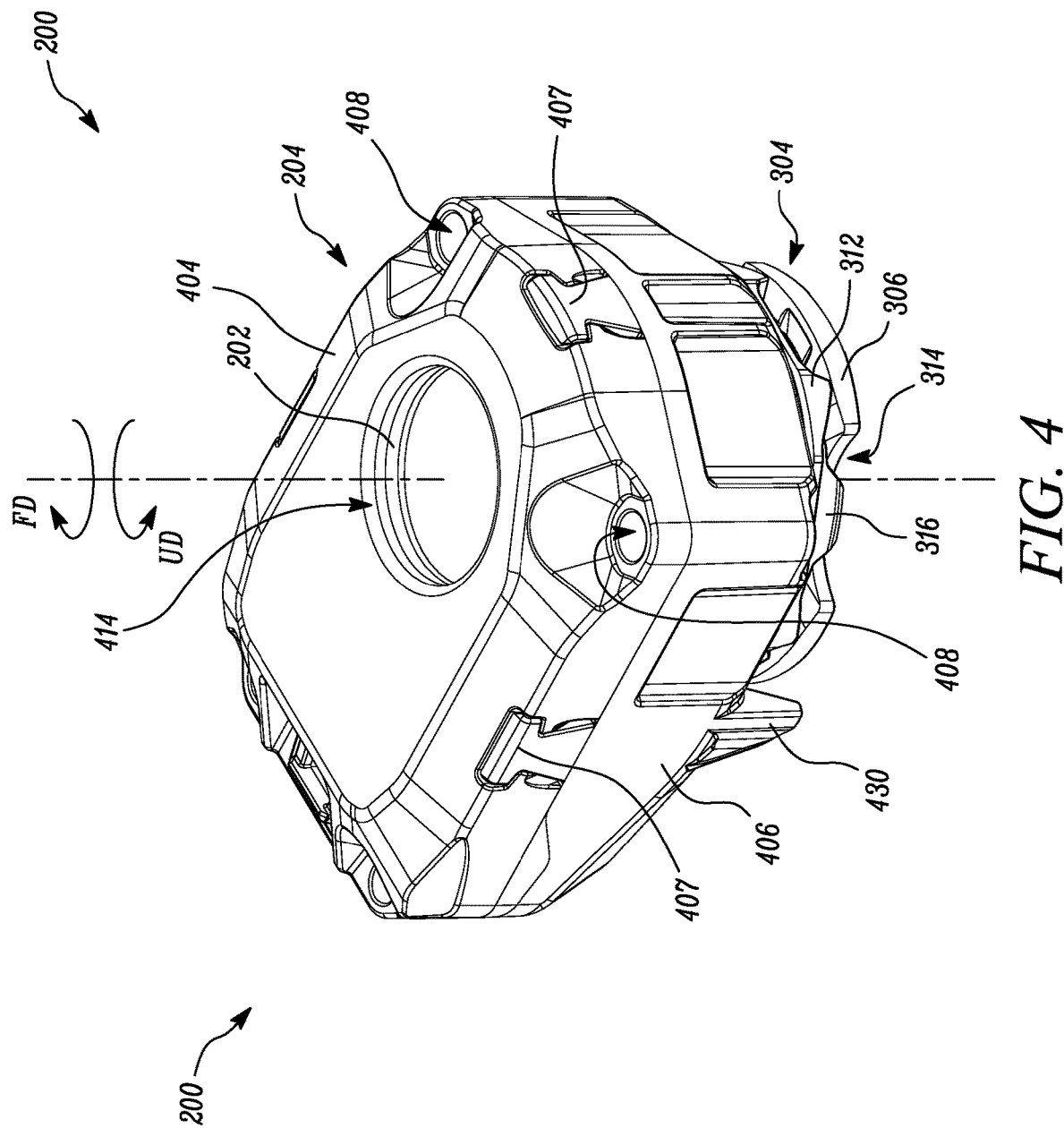
FIG. 4 is a top perspective view of an example of the actuating device.
Figure 5:
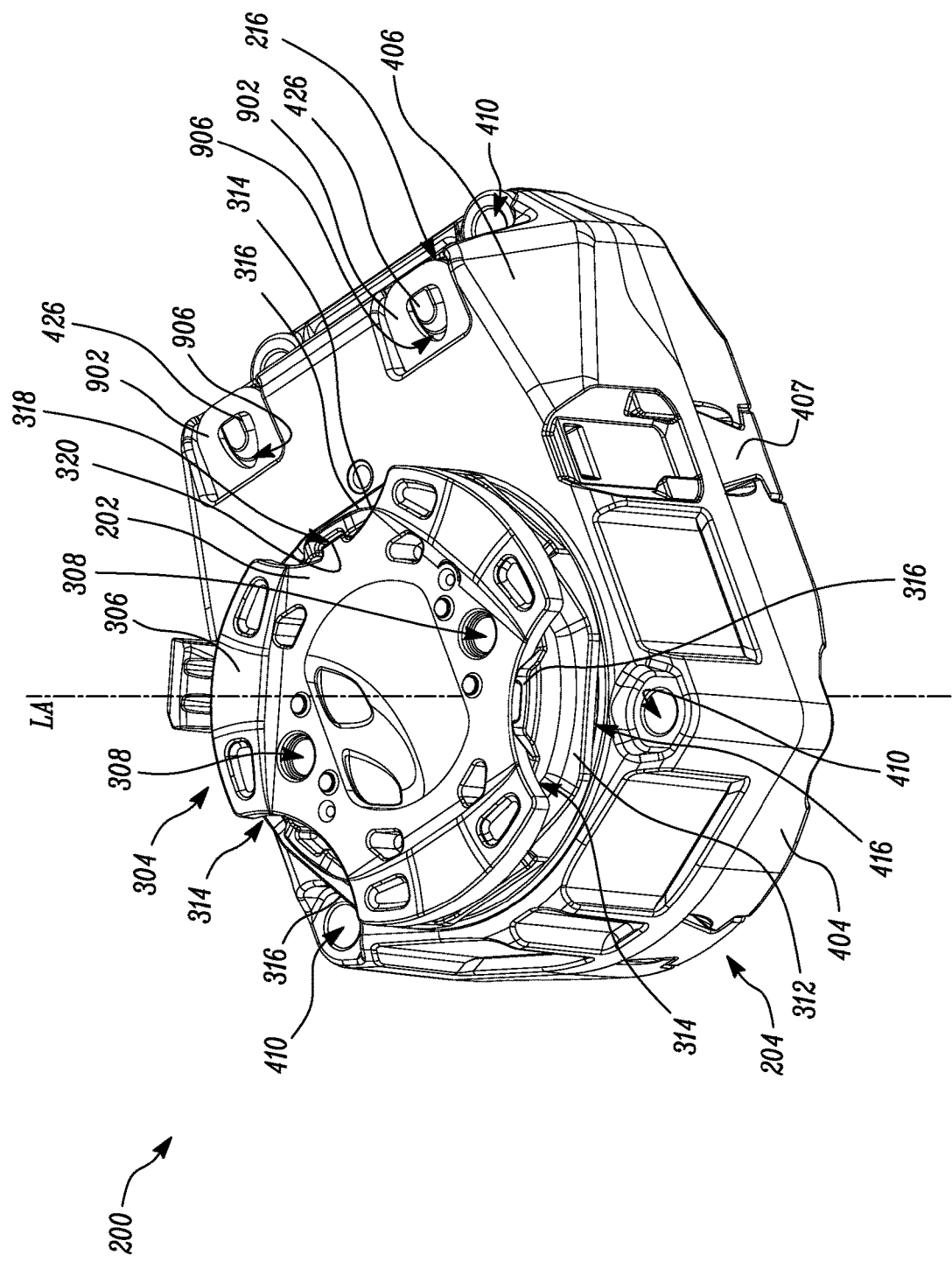
FIG. 5 is a bottom perspective view of an example of the actuating device.
Figure 6:
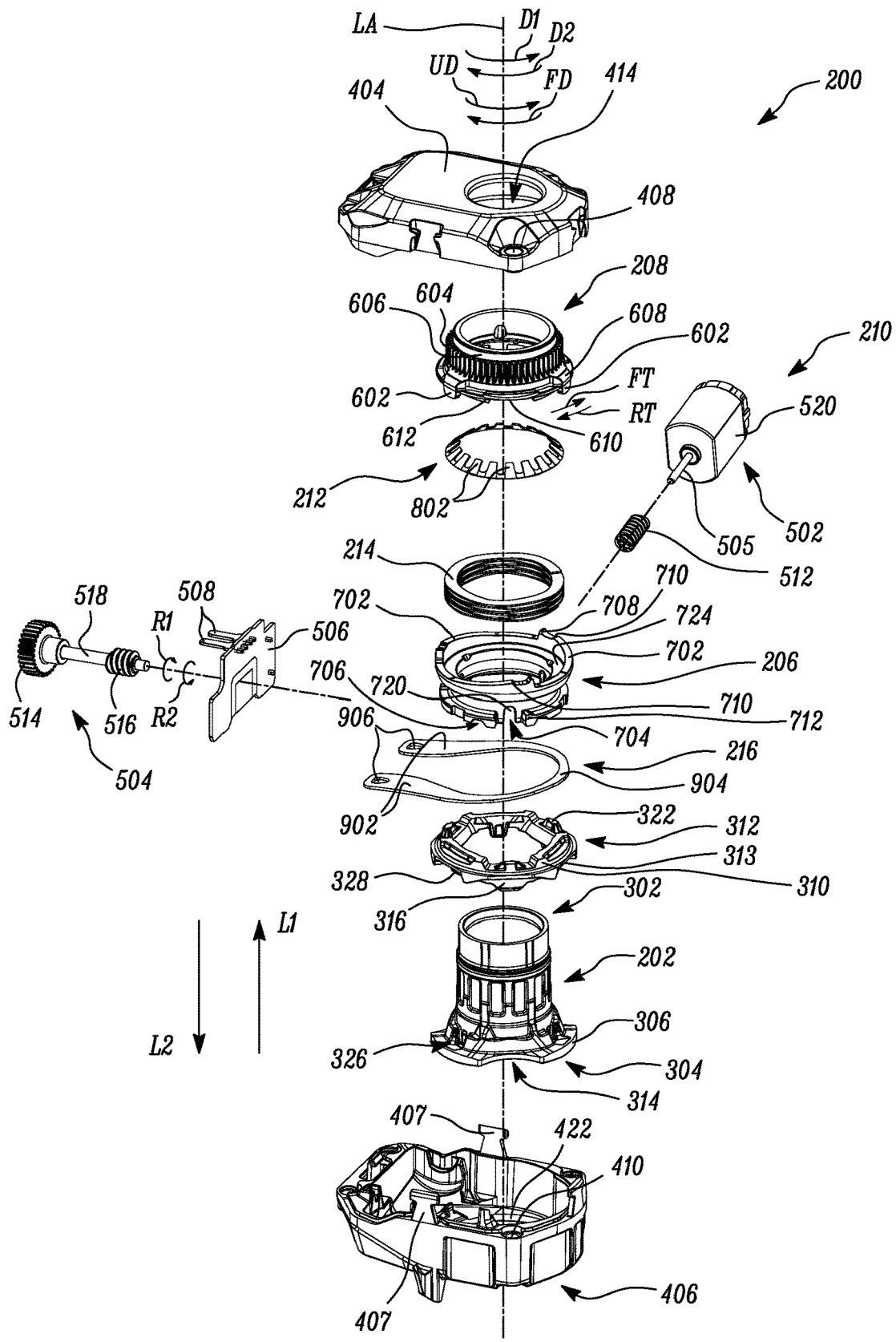
FIG. 6 is an exploded view of an example of the actuating device.
Figure 7:
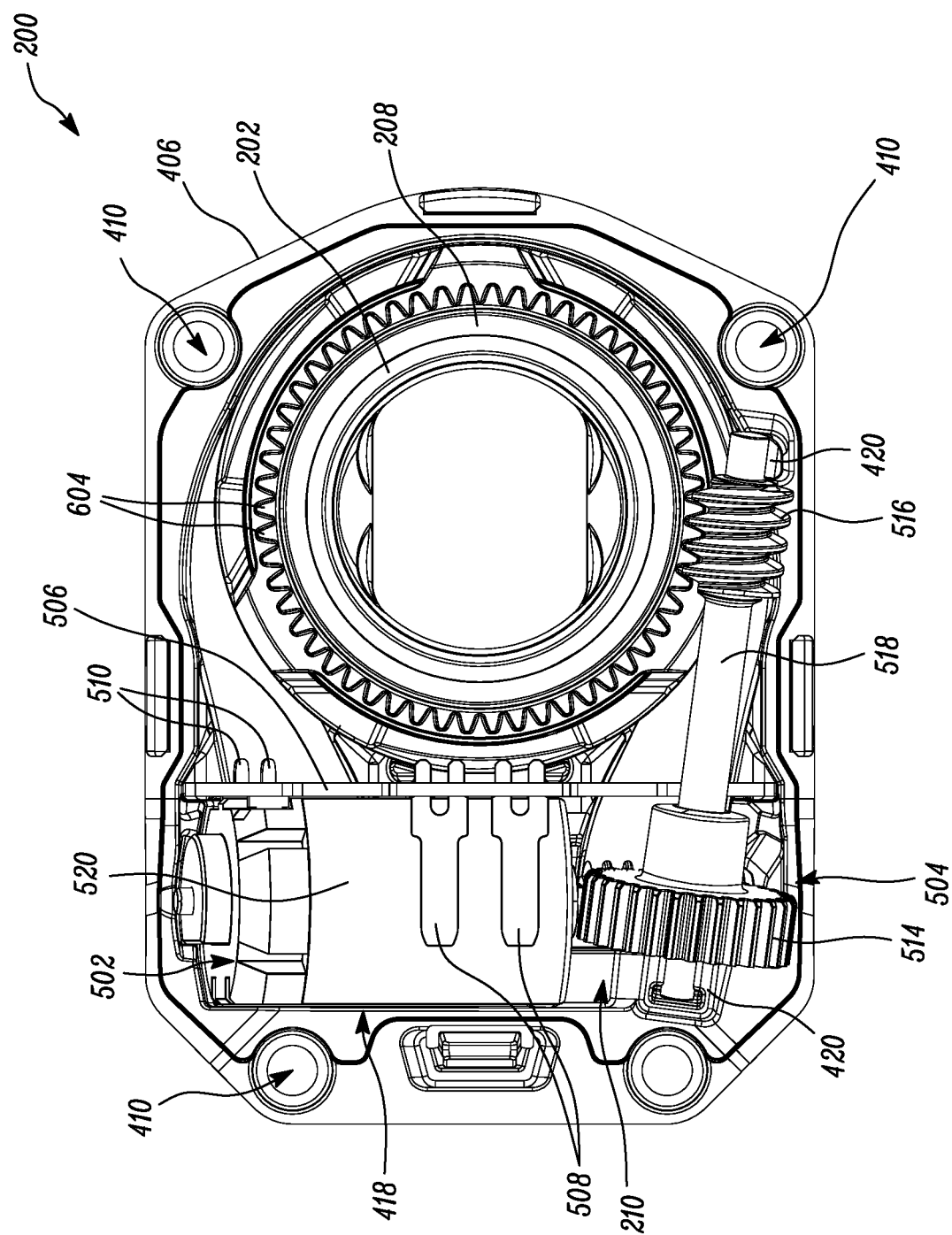
FIG. 7 is a top view of an example of the actuating device without a first housing part.

FIGS. 3A and 3B illustrate an actuating device 200 for a component, such as the component 102. The actuating device 200 includes a shaft 202 coupled to the vehicle 100 and a housing 204 coupled to the component 102. The actuating device 200 may move the component 102 between the unfolded position (shown in FIG. 2A) and the folded position (shown in FIG. 2B). The housing 204 may be coupled to a mirror casing 104 (shown in FIGS. 2A and 2B) of the component 102. A mirror may be movable with respect to the mirror casing 104. The housing 204 may be movable between a first position (shown in FIG. 3A) and a second position (shown in FIG. 3B) with respect to the shaft 202. The first position of the housing 204 may correspond to the unfolded position of the component 102. The second position of the housing 204 may correspond to the folded position of the component 102. The housing 204 may rotate in a folding direction "FD" relative to the shaft 202 to move the mirror casing 104 of the component 102 from the unfolded position to the folded position. The housing 204 may rotate in an unfolding direction "UD" relative to the shaft 202 to move the mirror casing 104 of the component 102 from the folded position to the unfolded position. The unfolding direction "UD" may be opposite to the folding direction "FD". The actuating device 200 may also be movable to other positions or assume different configurations based on various factors, for example, a manual actuation of the component 102, an impact on the component 102, and so forth. The rotation of the component 102, as used herein, may refer to the rotation of the mirror casing 104.

Further, the mirror casing 104 of the component 102 may move between the folding and unfolding positions.

FIGS. 4 to 13 illustrate different views of the actuating device 200 and its parts. Referring to FIGS. 3A, 3B and 4 to 13, the actuating device 200 includes the shaft 202, the housing 204, a clutch ring 206, a drive gear 208, a motor drive 210, a retaining ring 212, a first spring 214 and a second spring 216. The shaft 202 defines a longitudinal axis "LA" along a length thereof. The shaft 202 has a substantially hollow cylindrical configuration having a top end 302 and a bottom end 304 opposite to the top end 302. The shaft 202 may be rigidly mounted on a body of the vehicle 100. The shaft 202 includes a flange 306 at the bottom end 304. The flange 306 may be mounted on the vehicle 100. The shaft 202 includes multiple apertures 308 in the flange 306. The apertures 308 may receiving corresponding fasteners (not shown) to fixedly couple the shaft 202 to the vehicle 100.

The shaft 202 includes a plurality of detent teeth 310 proximal to the bottom end 304. In the illustrated example, the shaft 202 includes a locking ring 312 coupled to the shaft 202 near the bottom end 304. The locking ring 312 has a substantially annular configuration and is disposed around the shaft 202. The locking ring 312 may be disposed adjacent to the flange 306. The locking ring 312 includes the detent teeth 310 (shown in FIGS. 8, 9 and 10). In an alternative example, the shaft 202 may be a single component with integrally formed detent teeth. The locking ring 312 may be fixedly coupled to the shaft 202. Specifically, the locking ring 312 may be rotationally and translationally locked with the shaft 202. The locking ring 312 includes a ring portion 313 disposed around the shaft 202. The flange 306 of the shaft 202 defines multiple recesses 314. The locking ring 312 includes multiple projections 316 that are received in the corresponding recesses 314 of the shaft 202. The projections 316 extend downwardly from the ring portion 313. The recesses 314 are provided for locating the shaft 202 with respect to the vehicle 100 (shown in FIG. 1). The projections 316 are assembly guides. Further, at least one of the projections 316 includes a channel 318 (shown in FIG. 5) that receives a stop 320 disposed in the corresponding recess 314. The stop 320 may extend from the flange 306 of the shaft 202. The channel 318 and the stop 320 are assembly guides and form a poka-yoke connection.

The shaft 202 further defines multiple locking recesses 326 disposed adjacent to the flange 306. The locking ring 312 includes multiple locking projections 328 that are received in the corresponding locking recesses 326 of the shaft 202. The engagement between the locking projections 328 and the corresponding locking recesses 326 rotationally locks the locking ring 312 relative to the shaft 202. The locking ring 312 may alternatively or additionally be coupled to the shaft 202 by various methods, such as mechanical fasteners, welding, tongue and groove joints, or any other joining method.

Each detent tooth 310 extends upwardly from the ring portion 313. The locking ring 312 may include six detent teeth 310 evenly spaced around the ring portion 313. An angle between adjacent detent teeth 310 may be approximately 60 degrees. The locking ring 312 may include any number of detent teeth 310, for example, four or eight, as per application requirements. The locking ring 312 further includes multiple supports 322. Each support 322 extends upwardly from the ring portion 313. Further, each support 322 is angularly disposed between two detent teeth 310. The locking ring 312 may include three supports 322 evenly spaced around the ring portion 313. An angle between adjacent supports 322 may be approximately 120 degrees.

The housing 204 is movably disposed around the shaft 202 and coupled to the component 102 (shown in FIG. 2A). Specifically, the housing 204 may rotate and translate relative to the shaft 202. The housing 204 also at least partially encloses the shaft 202. The housing 204 includes a plurality of tabs 402 (shown in FIG. 11). In the illustrated example, the housing 204 includes an first housing part 404 and a second housing part 406 coupled to the first housing part 404. The second housing part 406 includes the plurality of tabs 402. In other examples, the housing 204 may be a single part. The first housing part 404 may be interchangeably referred to as "the first housing 404". Similarly, the second housing part 406 may be interchangeably referred to as "the second housing 406". The first housing 404 and the second housing 406 are coupled to each other by multiple clips 407. The clips 407 may provide snap-fit connections between the first and second housings 404, 406. Alternatively or additionally, the first and second housings 404, 406 may be attached to each other via screws, ultrasonic welding or any other suitable form of attachment.

The first housing 404 is disposed proximal to the top end 302 of the shaft 202. The second housing 406 is distal to the top end 302. The first housing 404 includes multiple first apertures 408 disposed along its outer periphery. The second housing 406 similarly includes multiple second apertures 410 (shown in FIG. 7) disposed along its outer periphery. The first apertures 408 of the first housing 404 may be axially aligned with corresponding second apertures 410 of the second housing 406. Mechanical fasteners, such as screws, may be inserted into the corresponding first and second apertures 408, 410 for coupling the first and second housings 404, 406 to the component 102. In some examples, the four first apertures 408 and the four second apertures 410 may be used for coupling the first and second housings 404, 406 to the component 102. In other embodiments, zero, two, or three screws may be used for coupling the first and second housings 404, 406 to the component 102. In case of zero screws, clips may be provided at a base of the component 102. The clips can be used to attach and hold the actuating device 200. The first and second housings 404, 406 may rotate around the shaft 202 and support the component 102. The first and second housings 404, 406 may move the component 102 between the folded and unfolded positions.

The first housing 404 includes a first opening 414 at its upper end. The second housing 406 includes a second opening 416 at its lower end. Each of the first and second openings 414, 416 may be circular. The first and second openings 414, 416 may be coaxial. Further, the first and second openings 414, 416 and the shaft 202 may be coaxial with respect to the longitudinal axis "LA". The shaft 202 may extend through the second opening 416 such that the flange 306 and part of the locking ring 312 are located outside the housing 204.

In the illustrated example, the second housing 406 includes three tabs 402 (shown in FIG. 11) extending inwardly from an inner surface 422 of the second housing 406. The tabs 402 may be located adjacent to the second opening 416. The three tabs 402 may be evenly spaced on the inner surface 422 of the second housing 406. Each tab 402 may have a substantially trapezoidal shape. An angle between adjacent tabs 402 may be approximately 120 degrees. The second housing 406 may include any number of tabs 402, for example, two or four, as per applications requirements.

The first and second housings 404, 406 further enclose the motor drive 210. The motor drive 210 includes a motor 502 and a worm gear arrangement 504 driven by the motor 502. The motor 502 may be a direct current (DC) motor, an alternating current (AC), a universal motor, or any electrical device that converts electrical energy into a rotational power output. The motor drive 210 may additionally or alternatively include other forms of gear arrangements, for example, a planetary gear arrangement, a spur/helical gear arrangement, a strain wave gearing, or a combination thereof. The motor drive 210 is engaged with the housing 204 such that rotational and translational movements of the motor drive 210 cause corresponding rotational and translational movements of the housing 204. For example, a rotational movement of the motor drive 210 about the longitudinal axis "LA" may result in a corresponding rotational movement of the housing 204.

The actuating device 200 further includes a circuit board 506 that includes various circuitry components (not shown) for controlling the motor 502. The circuit board 506 may control various parameters of the motor 502, for example, output speed, direction of power output, switching on/off, and so forth. The circuit board 506 may be a printed circuit board assembly (PCBA). One or more circuitry components of the circuit board 506 may be electrically connected to the motor 502. The circuitry components may include various components, such as one or more processing components, one or more memory components, input/output ports, cables, and so forth. The processing components may include one or more general-purpose microprocessors, one or more special-purpose microprocessors and/or application-specific integrated circuits (ASICs), or a combination of such processing components. The instructions or data to be processed by the processor(s) may be stored in a computer-readable medium, such as a memory device. The memory device may be provided as a volatile memory, such as random access memory (RAM) or as a non-volatile memory, such as read-only memory (ROM), or as a combination of one or more RAM and ROM devices. The memory may store a variety of information and may be used for various purposes. The circuit board 506 may receive electric power from a power source (not shown) via a pair of connector pins 508. In an example, the power source may be an external power source. In an alternative example, the power source may include one or more batteries disposed inside the housing 204. The circuit board 506 may also be electrically connected to the motor 502 via one or more motor pins 510 (shown in FIG. 7). In an example, the motor 502 may receive electric power and control signals from the circuit board 506. In another example, the motor 502 may receive electric power directly from the power source. The motor 502 may include a separate motor driver (not shown) that receives control signals from the circuit board 506 and controls the motor 502 accordingly.

The motor worm 512 is drivably coupled to the drive gear 208. In the illustrated example, the worm gear arrangement 504 includes the motor worm 512 coupled to and driven by the output shaft 505 of the motor 502. The motor worm 512 is meshed with a worm wheel 514. The worm wheel 514 drives a drive worm 516. Specifically, the drive worm 516 is disposed on a worm shaft 518. The worm shaft 518 is coupled to and rotates with the worm wheel 514. In an example, the worm shaft 518 and the drive worm 516 are integral with each other. The drive worm 516 is meshed with the drive gear 208. The worm gear arrangement 504 therefore includes two worms, namely, the motor worm 512 and the drive worm 516. In another example, the worm gear arrangement 504 may include a single worm.

One or more components of the motor drive 210 may be supported by the second housing 406. For example, the motor 502 may be supported by a support section 418 (shown in FIG. 7) of the second housing 406. The support section 418 may be at least partly shaped like a motor housing 520 of the motor 502. The support section 418 may contact the motor housing 520 such that the motor housing 520 is engaged with the second housing 406. A movement of the motor housing 520 may cause a corresponding movement of the second housing 406. For example, rotation of the motor housing 520 may cause rotation of the second housing 406, and hence the first housing 404. Further, translation of the motor housing 520 may cause translation of the first and second housings 404, 406. In some examples, the motor housing 520 may also engage with one or more portions (not shown) of the first housing 404. The output shaft 505 extends from the motor housing 520 and can rotate relative to the motor housing 520. The output shaft 505 may not contact the second housing 406 and can rotate freely about its axis relative to the first and second housings 404, 406. Similarly, the motor worm 512, the worm wheel 514 and the drive worm 516 can rotate freely about their corresponding axes with respect to the first and second housings 404, 406. The worm shaft 518 may be rotatably supported by the second housing 406 at one or more shaft supports 420 (shown in FIG. 7). Similar shaft supports are also provided on the first housing 404 to rotatably support the worm shaft 518. The worm shaft 518 also includes a first end proximate the worm wheel 514 and a second end opposite to the first end. Since the worm shaft 518 is tilted, a first end of the worm shaft 518 is largely in the second housing 406 and a second end of the worm shaft 518 is largely in the first housing 404.

Figure 8:
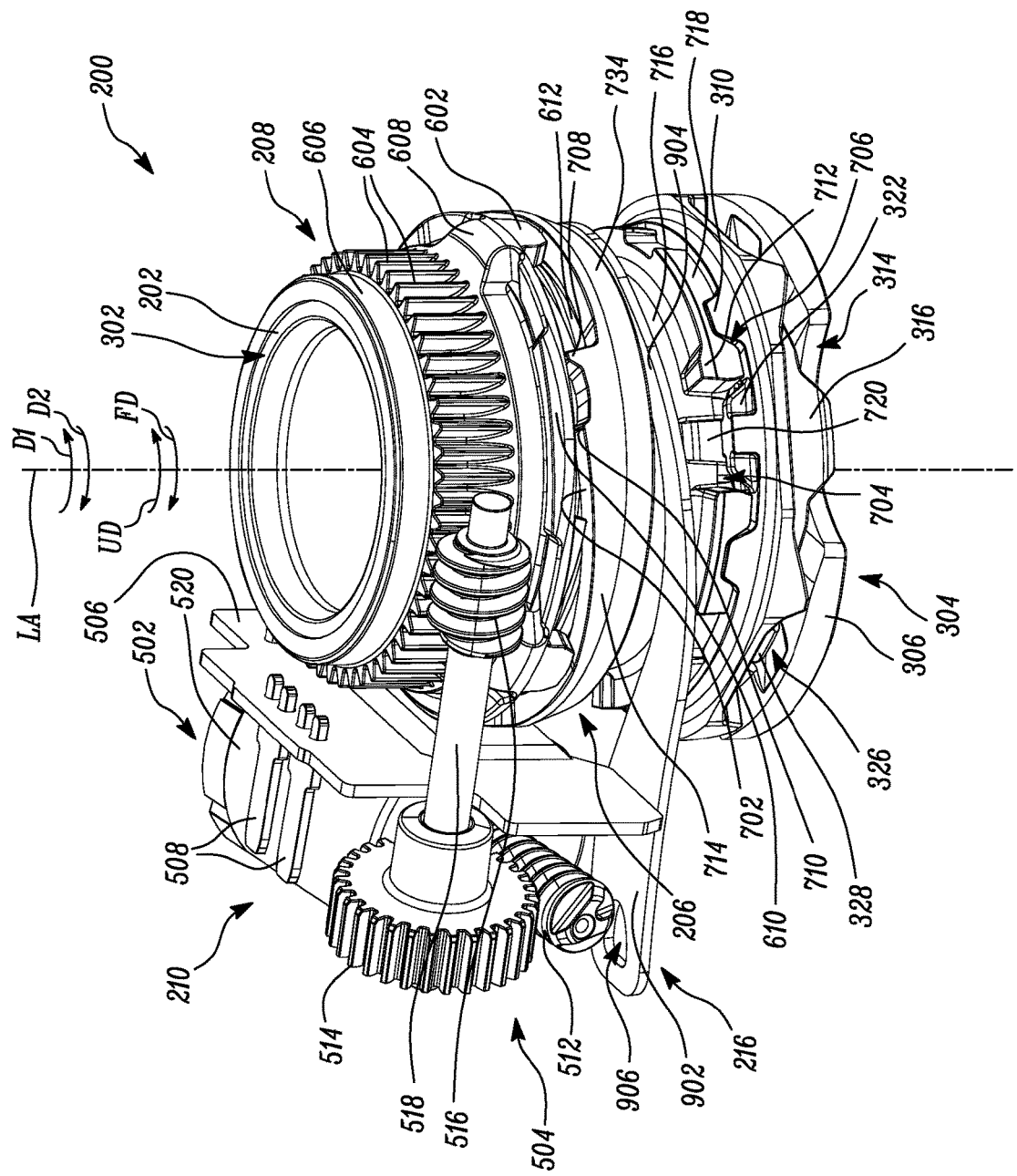
FIG. 8 is a perspective view of an example of the actuating device without a housing.
Figure 9:
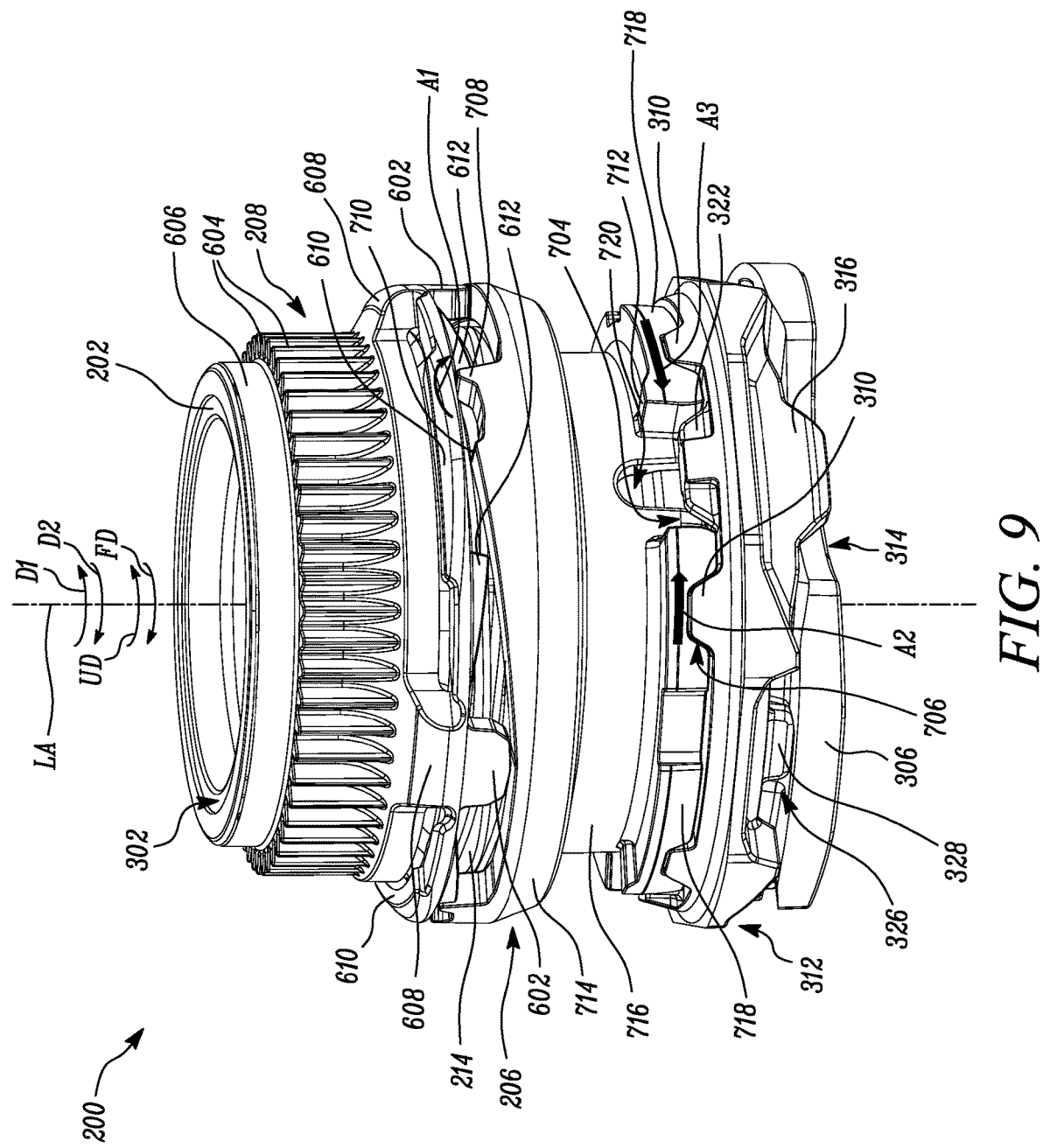
FIG. 9 is a perspective view of an example of the actuating device without the housing, a motor drive and a plate spring.
Figure 10:
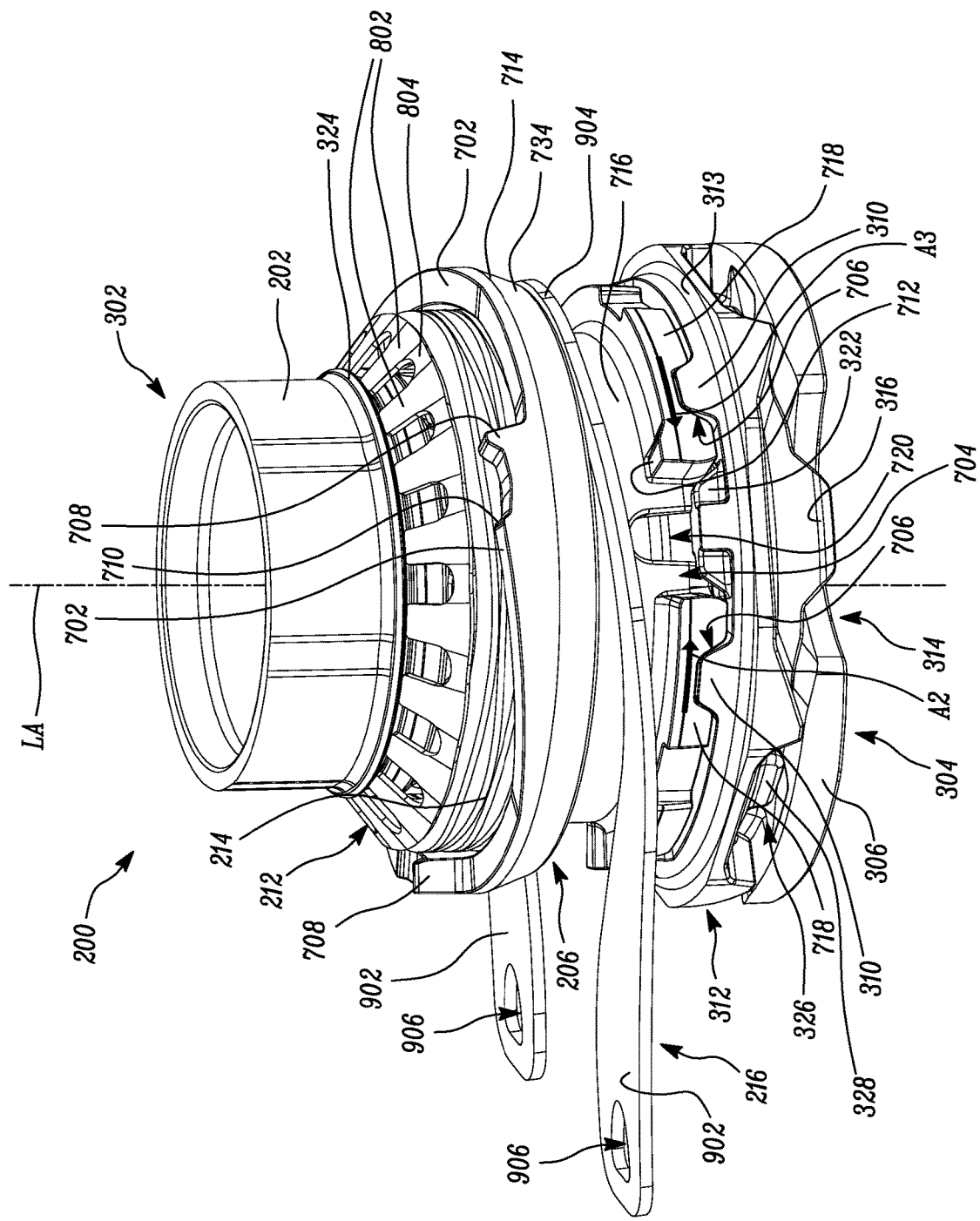
FIG. 10 is a perspective view of an example of the actuating device without the housing, the motor drive and a drive gear.
Figure 11:
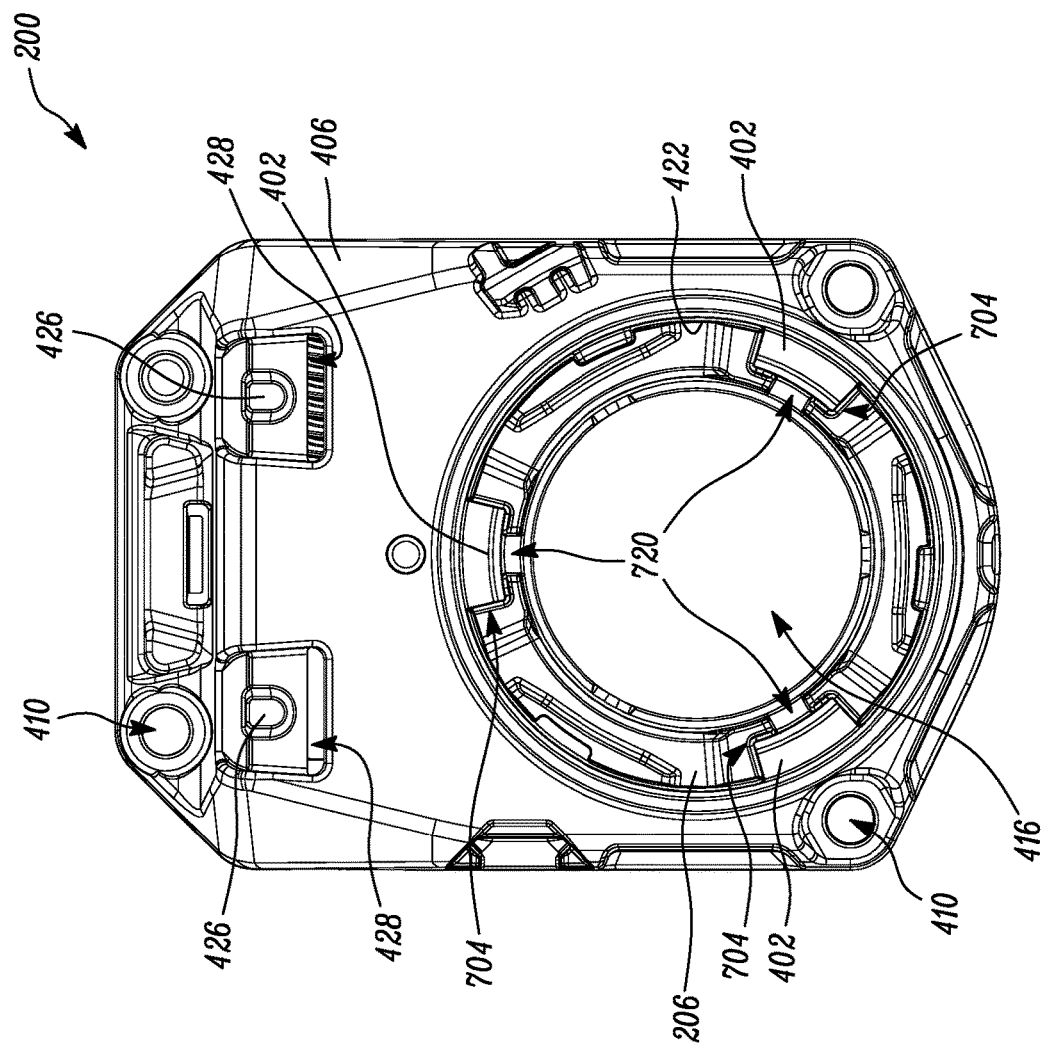
FIG. 11 is a bottom view of an example of the actuating device without a locking ring, a shaft and the plate spring.

The drive gear 208 is received within the housing 204 and movably disposed around the shaft 202. The drive gear 208 may be disposed around the shaft 202 at the top end 302. The drive gear 208 may rotate and translate relative to the shaft 202. The drive gear 208 includes a plurality of cam followers 602 (shown in FIGS. 8 and 9). In the illustrated example, the drive gear 208 is a ring gear with multiple gear teeth 604 meshed with the drive worm 516 of the motor drive 210. Further, the drive gear 208 includes three cam followers 602. The three cam followers 602 may be evenly spaced on the drive gear 208. Therefore, an angle between adjacent cam followers 602 may be approximately 120 degrees. Each cam follower 602 may be substantially U-shaped. The cam followers 602, as shown in FIGS. 8 and 9, are exemplary in nature, and a geometry of each cam follower 602 may be chosen as per functional requirements. The drive gear 208 may include any number of cam followers, for example, two or four, as per application requirements. Further, the drive gear 208 includes a gear portion 606 that includes the gear teeth 604. The gear portion 606 may have a substantially annular configuration. The gear portion 606 also includes a bearing surface which locates into the first housing 404. The interaction with the bearing surface combined with the interaction of the tabs 402 into corresponding engagement grooves 704 provide the physical support and stability of the component 102 in the drive position. Multiple support portions 608 extend outwardly from the gear portion 606.

Multiple annular portions 610 are connected to support portions 608. In the illustrated example, the drive gear 208 includes three support portions 608 and three annular portions 610. A number of the support portions 608 and a number of the annular portions 610 may vary as per the number of the cam followers 602. Each annular portion 610 is disposed between two adjacent support portions 608. The cam followers 602 extend downwardly from the corresponding support portions 608. Each annular portion 610 includes two locking teeth 612 extending downwardly from the annular portion 610.

The clutch ring 206 is disposed adjacent to the drive gear 208. Further, the clutch ring 206 may be axially disposed between the drive gear 208 and the locking ring 312. The clutch ring 206 may be supported by the locking ring 312. The clutch ring 206 is received within the housing 204 and movably disposed around the shaft 202. The clutch ring 206 may rotate and translate relative to the shaft 202. The clutch ring 206 may have a substantially hollow cylindrical shape. As shown in FIGS. 8, 9, 10 and 13, the clutch ring 206 includes a plurality of cam surfaces 702, the plurality of engagement grooves 704, a plurality of detent recesses 706, a plurality of hard stops 708, a plurality of soft detents 710 and a plurality of engagement ledges 712.

The clutch ring 206 includes an upper portion 714 and a lower portion 716. The upper portion 714 is disposed adjacent to the drive gear 208, while the lower portion 716 is disposed adjacent to the locking ring 312. An average width of the lower portion 716 may be less than an average width of the upper portion 714. The clutch ring 206 further includes multiple flange portions 718 circumferentially disposed around the lower portion 716. In the illustrated example, the clutch ring 206 includes three flange portions 718 spaced apart from each other. The flange portions 718 may be evenly spaced around the circumference of the lower portion 716.

In the illustrated example, the clutch ring 206 includes three engagement grooves 704 evenly spaced around the circumference of the clutch ring 206. An angle between adjacent engagement grooves 704 may be approximately 120 degrees. Each engagement groove 704 is defined between adjacent flange portions 718. Each engagement groove 704 may be substantially C-shaped. Substantially U-shaped cutouts 720 are disposed in the lower portion 716 between adjacent flange portions 718. Each U-shaped cutout 720 may be aligned with a corresponding engagement groove 704. Each tab 402 (shown in FIG. 11) of the housing 204 is configured to be at least partially and removably received within a corresponding engagement groove 704 from the plurality of engagement grooves 704 in order to rotationally lock the housing 204 relative to the clutch ring 206. The engagement between each tab 402 and the corresponding engagement groove 704 may also provide a substantial component of a lateral resistance to relative movement between the housing 204 and the clutch ring 206. The engagement between each tab 402 and the corresponding engagement groove 704 may further provide resistance to rotation about the other two principle rotational axes. The resistance to rotational and lateral movements of the housing 204 may be achieved in conjunction with an upper bushing interface between the shaft 202 and the drive gear 208 and the bearing interface between the drive gear 208 and the first housing 404. The supports 322 of the locking ring 312 are angularly aligned and disposed adjacent to the corresponding engagement grooves 704. Further, each support 322 is located radially outwards of the corresponding engagement groove 704. Each support 322 may have a substantially trapezoidal shape. The supports 322 of the locking ring 312 may be configured to support the corresponding tabs 402 received within the corresponding engagement grooves 704. The tabs 402 may be disposed on the corresponding supports 322 when the tabs 402 are engaged with the corresponding engagement grooves 704.

The clutch ring 206 further includes the plurality of engagement ledges 712 corresponding to the plurality of engagement grooves 704. Each engagement ledge 712 is disposed adjacent to the corresponding engagement groove 704. Each flange portion 718 includes the engagement ledge 712 at one end adjacent to the corresponding engagement groove 704. Each engagement ledge 712 may be a raised portion disposed on the corresponding flange portion 718. In an example, each engagement ledge 712 includes an inclined portion and a horizontal portion. The inclined portion extends upwards from a top surface of the corresponding flange portion 718. The horizontal portion extends from the inclined portion. The horizontal portion may be substantially parallel to a horizontal plane. An angle between the inclined portion and the horizontal portion may be in a range from about 10 degrees to about 60 degrees. The horizontal portion may therefore be raised with respect to the top surface of the flange portion 718. Each of the horizontal and inclined portions may have substantially planar surfaces with a rounded edge there between. In another example, each of the horizontal and inclined portions may have substantially helical surfaces. The engagement ledges 712 may facilitate re-engagement of the corresponding tabs 402 with the corresponding engagement grooves 704. The tabs 402 may strike against the respective engagement ledges 712 and be axially aligned with the corresponding engagement grooves 704.

Each of the flange portions 718 further defines a corresponding detent recess 706 from the plurality of detent recesses 706. Each detent recess 706 may have a substantially trapezoidal shape. Each detent recess 706 is configured to releasably engage with a corresponding detent tooth 310 from the plurality of detent teeth 310 in order to rotationally lock the clutch ring 206 relative to the shaft 202. Each detent tooth 310 may have a shape that is complementary to the shape of each detent recess 706. For example, each detent tooth 310 may have a substantially trapezoidal shape. In another example, each detent tooth 310 may have a substantially helical shape. Specifically, each detent tooth 310 may be defined by a symmetric pair of helixes.

The upper portion 714 includes the cam surfaces 702. The cam surfaces 702 are disposed at a top end of the clutch ring 206 and face the drive gear 208. In the illustrated example, the clutch ring 206 includes three cam surfaces 702 evenly spaced on the upper portion 714. A number of the cam surfaces 702 may vary as per the number of the cam followers 602 of the drive gear 208. Each cam follower 602 is configured to travel on a corresponding cam surface 702 from the plurality of cam surfaces 702. Each cam surface 702 extends upwards towards the drive gear 208. Each cam surface 702 may also have a radius of curvature with respect to the longitudinal axis "LA". A radius of curvature of each cam surface 702 may be substantially equal to a radius of curvature of the clutch ring 206 with respect to its central axis. A shape of each cam surface 702 may vary as per application requirements. Each cam surface 702 optionally includes a base portion. The base portion may be at least partly parallel to the horizontal plane. Further, the base portion may have a radius of curvature that is substantially equal to the radius of curvature of the clutch ring 206. Each cam surface 702 extends upwardly from the base portion. In some examples, each cam surface 702 may not include any base portion.

The clutch ring 206 further includes the plurality of hard stops 708 corresponding to the plurality of cam surfaces 702. Each hard stop 708 is disposed between two adjacent cam surfaces 702. Each cam surface 702 extends to the hard stop 708. Each cam follower 602 is configured to engage with a corresponding hard stop 708 from the plurality of hard stops 708. The motor drive 210 is configured to cease power output in response to the engagement of each cam follower 602 with the corresponding hard stop 708. The clutch ring 206 further includes the plurality of soft detents 710 corresponding to the plurality of cam surfaces 702. Each cam surface 702 includes one soft detent 710. Each soft detent 710 is disposed in the corresponding cam surface 702 proximal to the corresponding hard stop 708. Further, the cam surface 702 extends from the corresponding soft detent 710 to the corresponding hard stop 708. The cam surface 702 may be curved between the soft detent 710 and the hard stop 708.

Each hard stop 708 includes a first inclined surface extending upwardly from the corresponding cam surface 702, a top surface extending from the first inclined surface and a second inclined surface extending downwards from the top surface. A length of the first inclined surface is greater than a length of the second inclined surface. Angles of inclination of the first and second inclined surfaces may be equal or different. The cam follower 602 may engage with the first inclined surface. The second inclined surface extends to the base portion of the adjacent cam surface 702. A portion of the cam surface 702 adjacent to the second inclined surface may be curved. Each of the first and second inclined surfaces and the top surface may be substantially planar with rounded edges. In another example, each of the first and second inclined surfaces and the top surface may be substantially helical.

Each soft detent 710 is formed by a downwardly inclined surface disposed in the corresponding cam surface 702. A length of each soft detent 710 is less than the length of each hard stop 708. Further, an angle of inclination of each soft detent 710 may be substantially equal to the angle of inclination of each hard stop 708. A curved region disposed between each soft detent 710 and each hard stop 708 may have a radius of curvature that affects a performance of the soft detent 710 and the hard stop 708 in addition to the respective angles of inclination, lengths and relative spring forces at the given position. Each soft detent 710 may not provide any resistance to a forward travel "FT" of the cam follower 602 along the cam surface 702 towards the hard stop 708. However, each soft detent 710 may provide a degree of resistance to a reverse travel "RT" of the cam follower 602 away the hard stop 708 along the cam surface 702. Each hard stop 708 may provide a greater degree of resistance to the forward travel "FT" of the cam follower 602 than that of each soft detent 710.

The upper portion 714 of the clutch ring 206 may therefore include three regions disposed adjacent to each other along its top surface. Each region includes one cam surface 702, one soft detent 710, and one hard stop 708. In certain cases, each cam follower 602 may travel from one region to the adjacent region. Specifically, each cam follower 602 may travel over the hard stop 708 of one region to move to the adjacent region.

In certain configurations of the actuating device 200, one of the locking teeth 612 of each annular portion 610 of the drive gear 208 may engage with the corresponding hard stop 708. Specifically, one of the locking teeth 612 may engage with the second inclined surface of the corresponding hard stop 708. The two locking teeth 612 on each annular portion 610 may have opposite orientations. Similarly, the locking teeth 612 on opposite sides of each cam follower 602 may have opposite orientations. The locking tooth 612 with the suitable orientation may engage with the hard stop 708 when the cam followers 602 do not contact the corresponding cam surfaces 702 and are disposed above the corresponding cam surfaces 702. The engagement between the locking teeth 612 and the corresponding hard stops 708 may prevent further unfolding rotation of the drive gear 208, the motor drive 210 and the housing 204 beyond the first position. The locking tooth 612 with opposite orientations are provided to enable the drive gear 208 to be symmetric, and can therefore be used on both left-handed and right-handed configurations of the actuating device 200. In each configuration, only one directional set of locking teeth 612 may be used and engage with the respective hard stops 708.

The actuating device 200 further includes the retaining ring 212 (shown in FIGS. 6 and 10) disposed around the shaft 202. The retaining ring 212 may have a substantially annular configuration. The retaining ring 212 includes a plurality of protrusions 802 (shown in FIG. 10) configured to engage with the shaft 202. The protrusions 802 may be inclined relative to the longitudinal axis "LA" and are disposed circumferentially around the shaft 202. Each protrusion 802 has a substantially rectangular shape with rounded edges. Further, adjacent protrusions 802 are separated by curved portions 804 (shown in FIG. 10). The protrusions 802 may engage a circumferential lip 324 of the shaft 202. Further, the retaining ring 212 may be radially disposed between the drive gear 208 and the shaft 202.

The actuating device 200 further includes the first spring 214 (shown in FIGS. 6 and 10) disposed between the retaining ring 212 and the clutch ring 206. In the illustrated embodiment, the first spring 214 is a wave spring. However, in alternative embodiments, the first spring 214 may be a coiled wire spring. The first spring 214 includes multiple turns. An upper end of the first spring 214 may engage a lower surface of the retaining ring 212. Further, a lower end of the first spring 214 may be received on an annular lip 724 (shown in FIG. 6) of the clutch ring 206. In some examples, the first spring 214 may have multiple points of contact at both ends. The first spring 214 may be compressed due to an upward movement of the clutch ring 206 along the longitudinal axis "LA". The engagement between the protrusions 802 and the shaft 202 may prevent upward movement of the retaining ring 212 and the first spring 214 during upward movement of the clutch ring 206.

The actuating device 200 further includes the second spring 216 disposed between the clutch ring 206 and the housing 204. Specifically, the second spring 216 is disposed between the clutch ring 206 and the second housing 406. In the illustrated embodiment, the second spring 216 is a plate spring. However, in alternative embodiments, the second spring 216 may be a coiled wire spring or wave spring. The second spring 216 may be substantially U-shaped and includes a pair of arms 902 (shown in FIG. 10) extending from a curved section 904. The second spring 216 may be inclined with respect to the longitudinal axis "LA". The curved section 904 of the second spring 216 may engage an annular region 734 (shown in FIG. 10) defined by the upper portion 714 of the clutch ring 206. An opening 906 extends through each arm 902. Further, the opening 906 is disposed proximal to an end of each arm 902. The opening 906 may have an oval shape. Each arm 902 extends through a corresponding slot 428 (shown in FIG. 11) defined at a lower end of the second housing 406. The second housing 406 includes a pair of extensions 426 (shown in FIGS. 5 and 11) corresponding to the pair of arms 902. The extensions 426 project from a lower surface of the second housing 406. Each extension 426 may have a tapered shape. Each extension 426 is at least partially received through the opening 906 of the corresponding arm 902. The arms 902 may be biased towards the lower surface of the second housing 406. The second spring 216 may deform due to an upward movement of the housing 204 relative to the clutch ring 206. In an example, the second spring 216 may be partially deformed in the assembled state to provide a preload force. This force may then increase further as the housing 204 lifts relative to the clutch ring 206. The second spring 216 may further apply a force offset from the longitudinal axis "LA". Specifically, the second spring 216 may apply the force with a predetermined bias away from a center of mass of the component 102. This bias may be provided to partially balance a weight of the component 102 under normal (i.e., static gravitation) conditions, so that the movement of the housing 204 relative to the shaft 202 and the clutch ring 206 is subject to lower frictional forces which result from force couples.

Figure 12A:
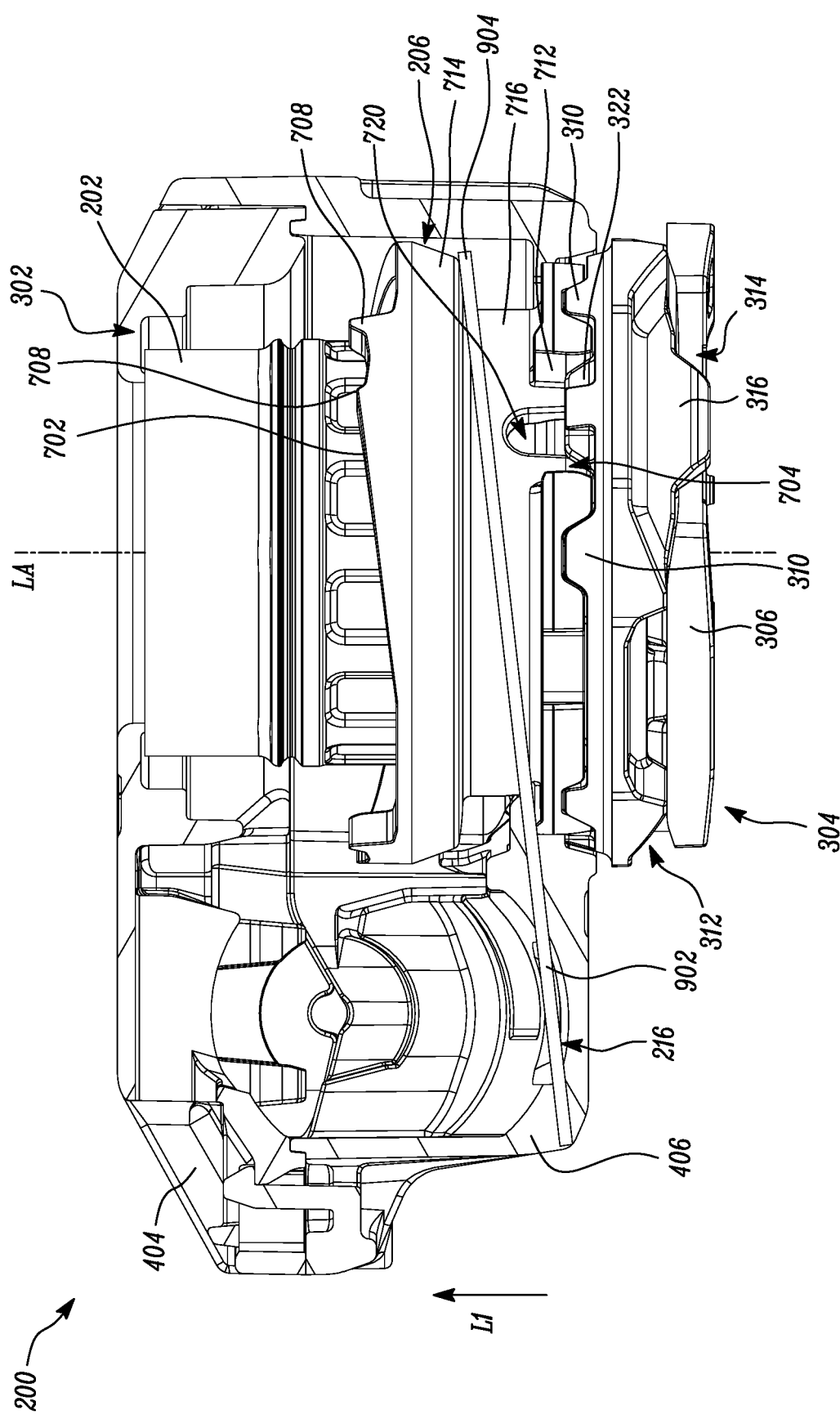
FIGS. 12A and 12B are partial cutaway views of an example of the actuating device showing the housing in lowered and raised positions, respectively.
Figure 12B:
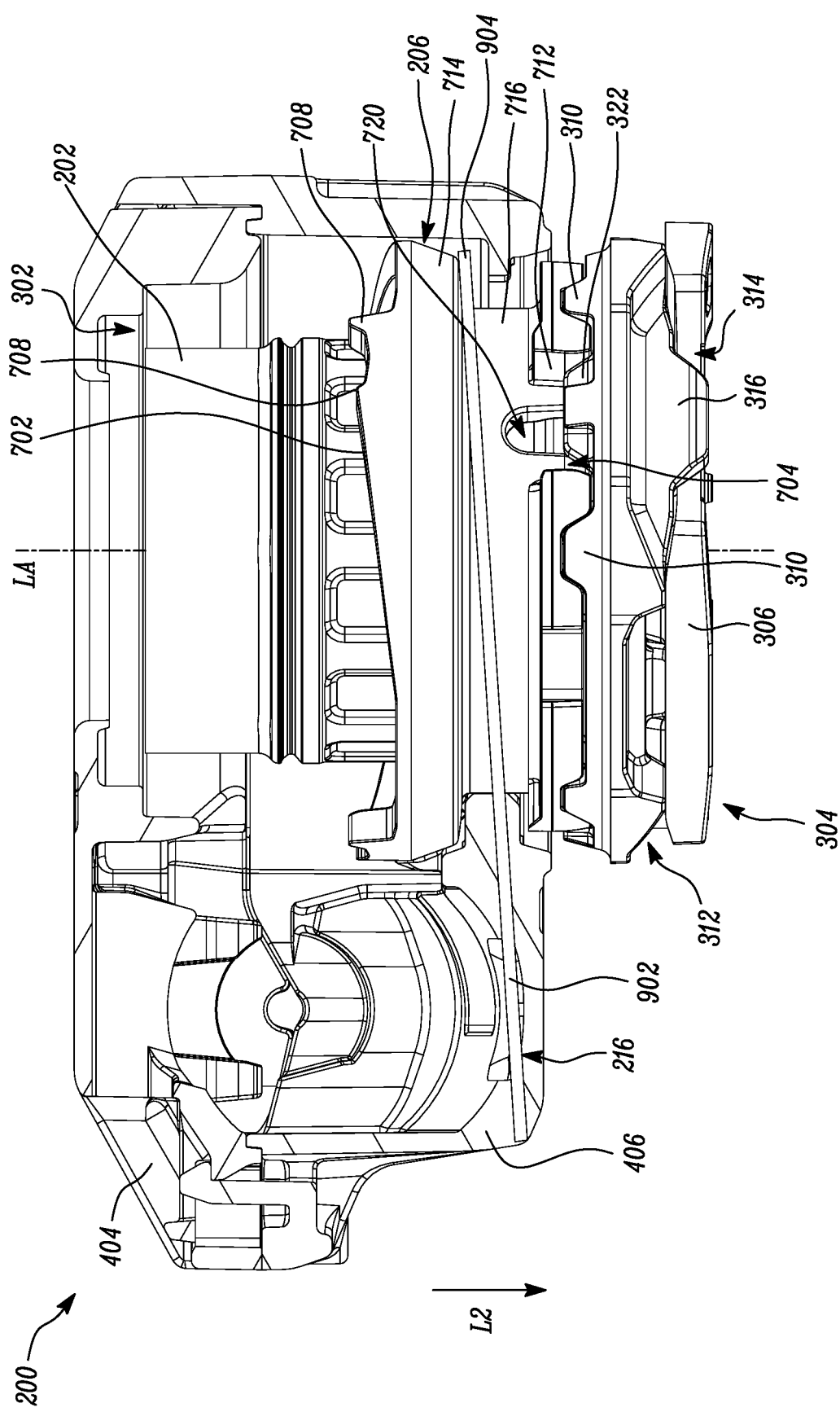
Figure 13:
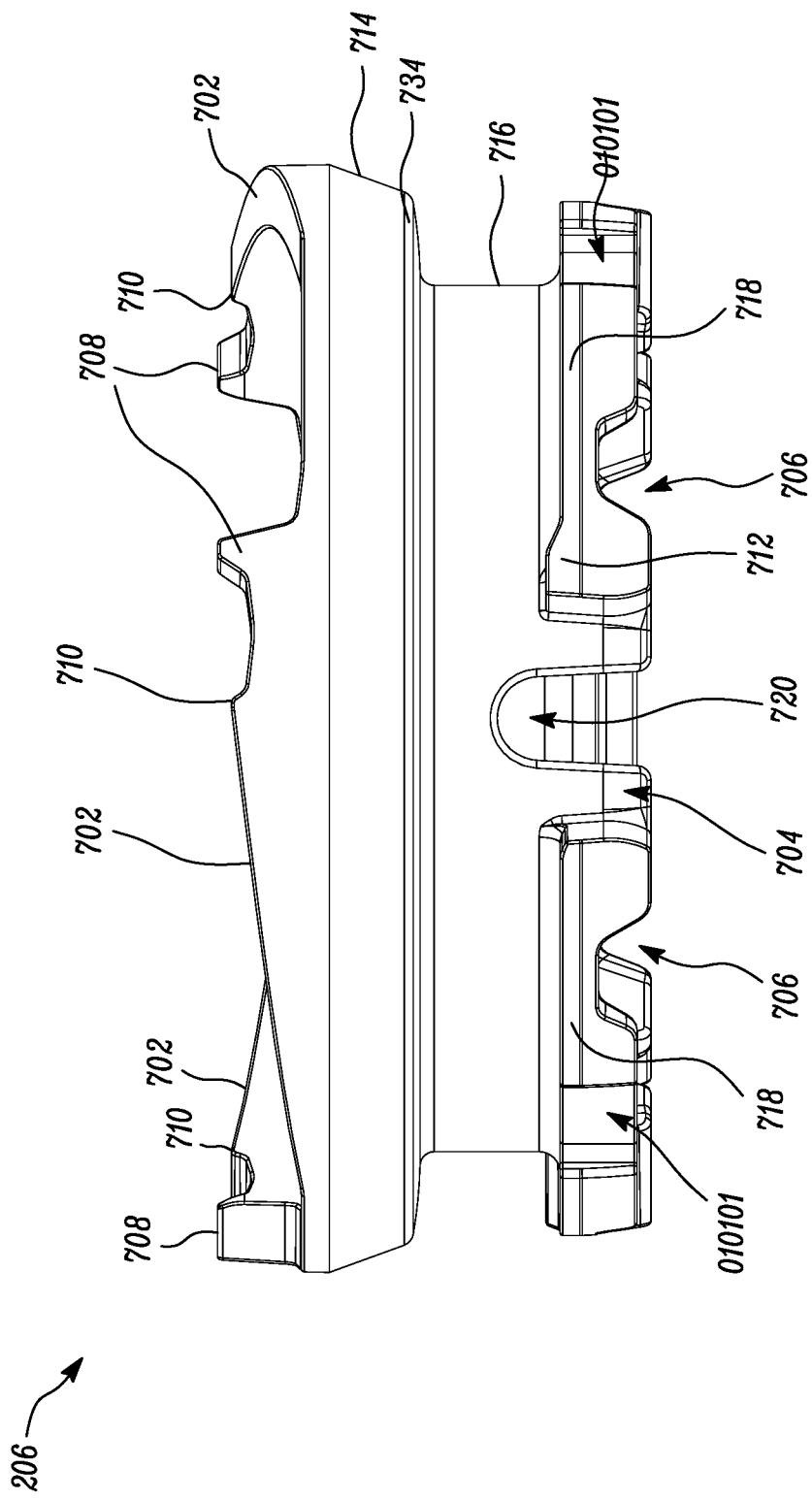
FIG. 13 is side view of an example of a clutch ring of the actuating device.

FIGS. 12A and 12B show translational movements of the housing 204 along the longitudinal axis "LA" relative to the shaft 202. The housing 204 may move upwards along a direction "L1" relative to the shaft 202. Further, the housing 204 may move downwards along a direction "L2" relative to the shaft 202. The direction "L2" may be opposite to the direction "L1". The second spring 216 may deform due to the movement of the housing 204 along the direction "L1".

An exemplary operation of the actuating device will be now described with reference to FIGS. 2A, 2B, 3A, 3B, and 4 to 13. In the unfolded position of the component 102, the housing 204 is in the first position. Various degrees of freedom of the housing 204 may be constrained in the first position. The degrees of freedom of the housing 204 include three rotational degrees of freedom A, B, C and three translational degrees of freedom X, Y, Z. The rotational degree of freedom A is the rotation about the longitudinal axis "LA". Z is defined along the longitudinal axis "LA". X and Y are lateral degrees of freedom. B and C denote tilt and roll of the housing 204. In the first position of the housing 204, each tab 402 is at least partially received within the corresponding engagement groove 704 and each detent recess 706 is engaged with the corresponding detent tooth 310. The housing 204 may be therefore rotationally locked (rotation A) with the clutch ring 206 in the first position. Since, the clutch ring 206 is also rotationally locked with the locking ring 312 and hence the shaft 202, the housing 204 may not be allowed to rotate in the first position. The first spring 214 may provide a force that holds the detent teeth 310 and the corresponding detent recesses 706 into engagement. The second spring 216 may provide a force that holds the tabs 402 engaged with the corresponding engagement grooves 704. This defines a default position along the longitudinal axis "LA" (Z). Engagement of the tabs 402 with the corresponding engagement grooves 704 may further provide lateral position control (X and Y), and tilt and roll (B and C) resistance when combined with the upper bushing interface. For all conditions other than the first position, the lower constraint is provided by the interaction between the tabs 402 and the lower portion 716 of the clutch ring 206. This interaction may provide loose resistance to freedoms B, C, X and Y, with A and Z being controlled by the interaction of the drive gear 208 and the cam surfaces 702 of the clutch ring 206. In some examples, the cam followers 602 may be spaced apart from the corresponding cam surfaces 702 in the first position of the housing 204.

The motor drive 210 is configured to provide power output in a first rotational direction "R1" (shown in FIG. 6) at the first position of the housing 204. Specifically, in order to move the component 102 from the unfolded position to the folded position, the motor drive 210 provides power output in the first rotational direction "R1". The motor 502 may be controlled by circuitry components in the circuit board 506. The motor 502 may provide rotational power output via the output shaft 505 based on control and/or power signals received from the circuit board 506. The output shaft 505 drives the motor worm 512 which, in turn, drives the worm wheel 514. The worm wheel 514 drives the worm shaft 518 and the drive worm 516. The drive worm 516 drives the drive gear 208. Power output of the motor drive 210 in the first rotational direction "R1" is provided by the drive worm 516. A direction of rotation of the output shaft 505 is such that the drive worm 516 rotates in the first rotational direction "R1" about its axis.

In response to power output in the first rotational direction "R1", the drive gear 208 rotates with respect to the shaft 202 such that each cam follower 602 travels on the corresponding cam surface 702 causing the motor drive 210 and the housing 204 to move away from the clutch ring 206 along the longitudinal axis "LA". Further, a movement of the housing 204 away from the clutch ring 206 causes each tab 402 to disengage from the corresponding engagement groove 704 and allows rotation of the housing 204 along with the motor drive 210 to the second position, as shown in FIG. 3B.

The engagement between the tabs 402 and the corresponding engagement grooves 704 may prevent rotation of the housing 204 in the first position. Consequently, the drive gear 208 rotates in a rotational direction "D1" about the longitudinal axis "LA". Due to the rotation of the drive gear 208, the cam followers 602 may travel on the corresponding cam surfaces 702 in the forward direction "FT" and move the drive gear 208 along with the motor drive 210 in a direction "L1" relative to the shaft 202. Due to the engagement between the motor drive 210 and the housing 204, the housing 204 may also move away from the clutch ring 206 along the direction "L1". Due to the upward movement of the housing 204, the second spring 216 may be further deformed, as shown in FIG. 12B. The upward movement of the housing 204 may also move the tabs 402 upwards relative to the clutch ring 206. The tabs 402 may be disengaged from the corresponding engagement grooves 704. The housing 204 and the motor drive 210 may be then free to rotate in the folding direction "FD". When the housing 204 and the motor drive 210 rotate in the folding direction "FD", the drive gear 208 may stop rotating relative to the shaft 202.

Disengagement of the tabs 402 from the corresponding engagement grooves 704 may lead to rotation of the motor drive 210 and the housing 204 in the folding direction "FD". In an example, an intermediate position of each cam follower 602 along the respective cam surface 702 may correspond to the second position of the housing 204 and the folded or park position of the component 102. In an example, the housing 204 may be prevented from further rotation along the folding direction "FD" due to engagement of the housing 204 with a stop (not shown) disposed on the vehicle 100 or the component 102. In the illustrated embodiment, the second housing 406 includes a rotational stop 430 (shown in FIG. 4). In an alternative example, a rotational stop or method may be implemented externally. When the housing 204 and the motor drive 210 stop rotating, the drive gear 208 may start rotating in the rotational direction "D1". The rotation of the drive gear 208 may move the cam followers 602 in the forward direction "FT" on the respective cam surfaces 702.

In an example, the cam followers 602 may continue to travel over the respective soft detents 710 and engage with the corresponding hard stops 708. The hard stops 78 may prevent further travel of the cam followers 602. Further, the engagement between the cam followers 602 and the corresponding hard stops 708 may cause rotational resistance on the drive gear 208 and the motor drive 210 to increase sharply, causing a stall condition that can be detected electronically and used to stop drive activity. Stopping drive activity may include stopping power output from the motor 502. The motor drive 210 may be configured to cease power output in response to the engagement of each cam follower 602 with the corresponding hard stop 708. The housing 204 may be in the second position and the component 102 may be in the folded position when the motor 502 is deactivated. The motor 502 may be deactivated by circuitry components in the circuit board 506.

To move the component 102 from the folded position to the unfolded position, the motor drive 210 may provide power output in a second rotational direction "R2" (shown in FIG. 6) opposite to the first rotational direction "R1". In an example, the motor drive 210 is configured to provide power output in the second rotational direction "R2" opposite to the first rotational direction "R1" at the second position of the housing 204. In response to power output in the second rotational direction "R2", the housing 204 along with the motor drive 210 rotates from the second position such that each tab 402 is aligned with the corresponding engagement groove 704. Upon alignment of each tab 402 with the corresponding engagement groove 704, the drive gear 208 rotates with respect to the shaft 202 to move the housing 204 to the first position.

To provide power output in the second rotational direction "R2" at the drive worm 516, the output shaft 505 of the motor 502 may rotate in an opposite direction. Due to power output in the second rotational direction "R2", the housing 204 and the motor drive 210 may rotate in the unfolding direction "UD" opposite to the folding direction "FD". The component 102 may also rotate from the folded position to the unfolded position. Rotation of the housing 204 in the unfolding direction "UD" may align the tabs 402 with the corresponding engagement grooves 704 with respect to the longitudinal axis "LA". The tabs 402 may be directly above the corresponding engagement grooves 704. Alignment between the tabs 402 and the corresponding engagement grooves 704 may be facilitated by the engagement ledges 712. The tabs 402 may contact the respective engagement ledges 712 due to the rotation of the housing 204 in the unfolding direction "UD". When the tabs 402 strike the respective engagement ledges 712, the housing 204 may stop rotating and the drive gear 208 may start rotating. The tabs 402 may be then located directly above the respective engagement grooves 704.

Once the tabs 402 are aligned with the corresponding engagement grooves 704, the drive gear 208 may start rotating in a rotational direction "D2" opposite to the rotational direction "D1". The cam followers 602 may start to travel downwards on the corresponding cam surfaces 702 during the reverse travel "RT". The soft detents 710 on the corresponding cam surfaces 702 may temporarily restrict the reverse travel "RT" of the corresponding cam followers 602, thereby preventing the housing 204 and the motor drive 210 to move downwards before rotation occurs in the unfolding direction "UD". As the cam followers 602 travel downwards on the corresponding cam surfaces 702, the second spring 216 may revert to its normal shape, causing the housing 204 to move downwards along the direction "L2". The downward movement of the housing 204 may cause the tabs 402 to reengage with the corresponding engagement grooves 704. The locking teeth 612 may engage with the corresponding hard stops 708 causing the rotational resistance to increase sharply and resulting in a detectable stall condition that can be used to end drive activity. The motor 502 may be deactivated to stop drive activity. The housing 204 may therefore move back to the first position and the component 102 may move back to the unfolded or drive position.

In some cases, the component 102 may be manually moved from the folded position to the unfolded position. The housing 204 along with the component 102 may be raised, thereby deforming the second spring 216. During this upward movement, the cam followers 602 may be engaged with the corresponding hard stops 708. In response to a movement of the component 102 at the second position of the housing 204, each cam follower 602 is configured to travel over (indicated by an arrow "A1" in FIG. 9) the corresponding hard stop 708 to allow the housing 204 to move to the first position. As the housing 204 moves up along with the motor drive 210 and the drive gear 208, the cam followers 602 may move up and over the corresponding hard stops 708 and then move downwards, causing the second spring 216 to revert to its normal shape. The component 102 may then continue to be manually folded until the tabs 402 of the second housing 406 hit against the corresponding engagement ledges 712 of the clutch ring 206 and then drop back into the corresponding engagement grooves 704. Consequently, the housing 204 may be fixed in the first position and the component 102 may be secured in the unfolded or drive position. In some cases, dependent on the fold angle, the housing 204 may not revert fully to the first position as a direct result of a manual override. In some situations, once the tabs 402 are located within the corresponding engagement grooves 704, they may only partially engage and the housing 204 may lower partially towards the first position. This may be caused due to the relative position of the cam surfaces 702 and the cam followers 602 in the overridden condition. While the housing 204 can be rotated back to its engagement orientation, the drive gear 208 is not reset and is therefore be distal from its first position by the same angle as has been used to create the folding movement. In order to move the housing 204 back to the first position, it may be necessary to reset the drive gear 208 by providing an electrical input. Due to a subsequent electrical input, the motor drive 210 may first move the housing 204 to the second position, typically with an extra delay while the drive gear 208 resets. Then, upon receiving the reverse input, the motor drive 210 may move the housing 204 to the true first position.

When the component 102 is secured in the unfolded or drive position, the component 102 may be subject to impacts in either rotational directions. In response to an impact on the component 102 at the first position of the housing 204, each detent recess 706 is configured to disengage from the corresponding detent tooth 310 to allow the housing 204 and the clutch ring 206 to move together along with the component 102. The detent recesses 706 may disengage from the corresponding detent tooth 310 in either directions (indicated as arrows "A2", "A3" in FIG. 9) based on the direction of the impact. The motor drive 210 is further configured to move the housing 204 to the first position after the movement of the component 102. In case of a manual impact in either rotational direction, the clutch ring 206 and the housing 204 along with the component 102 may move upwards, such that the detent recesses 706 of the clutch ring 206 is disengaged from the corresponding detent teeth 310 of the locking ring 312. As the housing 204 moves upwards, the first spring 214 may be compressed between the retaining ring 212 and the clutch ring 206. The tabs 402 of the second housing 406 may remain engaged with the corresponding engagement grooves 704 of the clutch ring 206 causing the clutch ring 206 and the housing 204 to remain together during manual impact. The engagement between the tabs 402 and the corresponding engagement grooves 704 may cause the clutch ring 206 to move out of the detent teeth 310. The motor drive 210 may be protected from any impact as the direct engagement of the housing 204 with the clutch ring 206 transfers torques and forces to the clutch ring 206 without significant reliance on the motor drive 210. Thus, any impact exerted on the housing 204 may cause the clutch ring 206 to move in relation to the shaft 202 and the locking ring 312. The detent teeth 310 can separate from the corresponding detent recesses 706 with the first spring 214 defining the resistance to separation. Therefore, the impact may not be transferred to the motor drive 210. The motor drive 210 may perform an electrical recovery and the first spring 214 may uncompress, causing the clutch ring 206 to move downwards and the detent recesses 706 to reengage with the corresponding detent teeth 310.

After a manual impact, the actuating device 200 may be recovered from any position by electrically driving the actuating device 200, as described above, towards the folded position of the component 102 or the second position of the housing 204. Once the cam followers 602 of the drive gear 208 reach the corresponding hard stops 708 of the clutch ring 206, the motor drive 210 may continue to provide power output such that the clutch ring 206 moves to its original position and drops back into the detent teeth 310 of the locking ring 312. Once the clutch ring 206 is rotationally locked with the locking ring 312 and the shaft 202, the housing 204 may be rotated in either the folding direction "FD" or the unfolding direction "UD", as desired. An electronic recovery operation may be implemented automatically by the circuitry components of the circuit board 506. Exemplary electronic recovery operations are described below where the housing 204 is moved to the first position corresponding to the drive or unfolded position of the component 102.

For example, if the housing 204 has been moved in the folding direction "FD" due to an impact, the motor drive 210 may move the drive gear 208 in the rotational direction "D1" causing the cam followers 602 to move in the forward direction "FT" and the housing 204 to move upwards in the direction "L1". The tabs 402 may be disengaged from the corresponding engagement grooves 704, and the housing 204 may be allowed to rotate in the folding direction "FD" to the second position. The cam followers 602 may get engaged with the corresponding hard stops 708 and move the clutch ring 206 into engagement with the detent teeth 310. Thereafter, the housing 204 may rotate in the unfolding direction "UD" causing the tabs 402 to strike the corresponding engagement ledges 712 and then reengage with the corresponding engagement grooves 704. The housing 204 may therefore be secured in the first position corresponding to the unfolded or drive position of the component 102.

In another example, if the housing 204 has been moved in the unfolding direction "UD" due to an impact, the motor drive 210 may move the drive gear 208 in the rotational direction "D1" causing the cam followers 602 to move in the forward direction "FT" and the housing 204 to move upwards in the direction "L1". The tabs 402 may be disengaged from the corresponding engagement grooves 704, and the housing 204 may be allowed to rotate in the folding direction "FD" to the second position. The cam followers 602 may get engaged with the corresponding hard stops 708 and move the clutch ring 206 into engagement with the detent teeth 310. Thereafter, the housing 204 may rotate in the unfolding direction "UD" causing the tabs 402 to strike the corresponding engagement ledges 712 and then reengage with the corresponding engagement grooves 704. The housing 204 may therefore be secured in the first position corresponding to the unfolded or drive position of the component 102.

The actuating device 200 may use fewer parts as well as less metallic components due to reduced strength requirements, thus reducing weight, size and cost of the actuating device 200. Further, the clutch ring 206 may isolate and protect the motor drive 210 from any external impacts on the component 102. The lifting of the housing 204 from engagement with the clutch ring 206 may also clear any seal or engagement between the mirror casing 104 and a base frame of the vehicle 100, thereby allowing the housing 204 and the mirror casing 104 to rotate freely. Further, the housing 204 may drop down into engagement with the clutch ring 206 once the mirror casing 104 moves to the unfolded or drive position, thereby removing any potential impact risk on the motor drive 210 and the drive gear 208 in the unfolded position of the component 102.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

Furthermore, the features of the disclosure disclosed in this specification, the claims and the drawings may be employed both individually and in any possible combination for practicing the disclosure in its various exemplary embodiments. In particular, all claim feature combinations, irrespective of the claim dependencies, are covered with this application.

LIST OF NUMBERS

100 Vehicle
102 Component
104 Mirror Casing
FD Folding Direction
UD Unfolding Direction
200 Actuating Device
202 Shaft 204 Housing
206 Clutch Ring
208 Drive Gear
210 Motor Drive
212 Retaining Ring
214 First Spring
215 Annular Lip
216 Second Spring
LA Longitudinal Axis
302 Top End
304 Bottom End
306 Flange
308 Apertures
310 Detent Teeth
312 Locking Ring
313 Ring Portion
314 Recess
316 Projections
318 Channel
320 Stop
322 Supports
324 Circumferential Lip
326 Locking Recesses
328 Locking Projections
402 Tabs
404 First Housing Part
406 Second Housing Part
407 Clips
408 First Apertures
410 Second Apertures
414 First Opening
416 Second Opening
418 Support Section
420 Shaft Supports
422 Inner Surface
426 Extensions
428 Slot
430 Rotational Stop
502 Motor
504 Worm Gear Arrangement
505 Output Shaft
506 Circuit Board
508 Connector Pins
510 Motor Pins
512 Motor Worm
514 Worm Wheel
516 Drive Worm
518 Worm Shaft
520 Motor Housing
602 Cam Followers
604 Gear Teeth
606 Gear Portion
608 Support Portions
610 Annular Portions
612 Locking Teeth
702 Cam Surfaces
704 Engagement Grooves
706 Detent Recesses
708 Hard Stops
710 Soft Detents
712 Engagement Ledges
714 Upper Portion
716 Lower Portion
718 Flange Portions
720 U-shaped Cutouts
724 Annular Lip
734 Annular Region
802 Protrusions
804 Curved Portions
902 Arms
904 Curved Section
906 Openings
FT Forward Travel
RT Reverse Travel
R1 First Rotational Direction
R2 Second Rotational Direction
D1 Rotational Direction
D2 Rotational Direction
L1 Direction
L2 Direction
A1 Arrow
A2 Arrow
A3 Arrow

The invention claimed is:

1. An actuating device for a component, the actuating device comprising:
a shaft comprising a plurality of detent teeth, the shaft defining a longitudinal axis along a length thereof;
a housing movably disposed around the shaft and coupled to the component, the housing comprising a plurality of tabs disposed on an inner surface of the housing;
a clutch ring received within the housing and movably disposed around the shaft, the clutch ring comprising a plurality of cam surfaces, a plurality of engagement grooves and a plurality of detent recesses, wherein each tab of the housing is configured to be at least partially and removably received within a corresponding engagement groove from the plurality of engagement grooves in order to rotationally lock the housing relative to the clutch ring, wherein each detent recess is configured to releasably engage with a corresponding detent tooth from the plurality of detent teeth in order to rotationally lock the clutch ring relative to the shaft;
a drive gear received within the housing and movably disposed around the shaft, the drive gear comprising a plurality of cam followers, wherein each cam follower is configured to travel on a corresponding cam surface from the plurality of cam surfaces; and
a motor drive drivably coupled to the drive gear, wherein the motor drive is engaged with the housing such that rotational and translational movements of the motor drive causes corresponding rotational and translational movements of the housing;
wherein, in a first position of the housing, each tab is at least partially received within the corresponding engagement groove and each detent recess is engaged with the corresponding detent tooth; and
wherein the motor drive is configured to provide power output in a first rotational direction at the first position of the housing, wherein, in response to power output in the first rotational direction, the drive gear rotates with respect to the shaft such that each cam follower travels on the corresponding cam surface causing the motor drive and the housing to move away from the clutch ring along the longitudinal axis, wherein a movement of the housing away from the clutch ring causes each tab to disengage from the corresponding engagement groove and allows rotation of the housing along with the motor drive to a second position.

2. The actuating device of claim 1, wherein the clutch ring further comprises a plurality of hard stops corresponding to the plurality of cam surfaces, each hard stop being disposed between two adjacent cam surfaces, wherein each cam follower is configured to engage with a corresponding hard stop from the plurality of hard stops, and wherein, the motor drive is configured to cease power output in response to the engagement of each cam follower with the corresponding hard stop.

3. The actuating device of claim 2, wherein the clutch ring further comprises a plurality of soft detents corresponding to the plurality of cam surfaces, wherein each soft detent is disposed on the corresponding cam surface proximal to the corresponding hard stop.

4. The actuating device of claim 2, wherein, in response to a movement of the component at the second position of the housing, each cam follower is configured to travel over the corresponding hard stop to allow the housing to move to the first position.

5. The actuating device of claim 1, wherein the clutch ring further comprises a plurality of engagement ledges corresponding to the plurality of engagement grooves, each engagement ledge being disposed adjacent to the corresponding engagement groove.

6. The actuating device of claim 1, wherein the motor drive is further configured to provide power output in a second rotational direction opposite to the first rotational direction at the second position of the housing, wherein, in response to power output in the second rotational direction, the housing along with the motor drive rotates from the second position such that each tab is aligned with the corresponding engagement groove, wherein, upon alignment of each tab with the corresponding engagement groove, the drive gear rotates with respect to the shaft to move the housing to the first position.

7. The actuating device of claim 1, wherein, in response to an impact on the component at the first position of the housing, each detent recess is configured to disengage from the corresponding detent tooth to allow the housing and the clutch ring to move together along with the component.

8. The actuating device of claim 7, wherein the motor drive is further configured to move the housing to the first position after movement of the component.

9. The actuating device of claim 1, further comprising:
a retaining ring disposed around the shaft, the retaining ring comprising a plurality of protrusions configured to engage with the shaft; and
a first spring disposed between the retaining ring and the clutch ring.

10. The actuating device of claim 1, further comprising a second spring disposed between the clutch ring and the housing, wherein the plate spring is coupled to the housing.

11. The actuating device of claim 1, wherein the housing comprises a first housing part and a second housing part coupled to the first housing part, wherein the second housing part comprises the plurality of tabs.

12. The actuating device of claim 1, wherein the motor drive comprises a motor and a worm gear arrangement driven by the motor, wherein the worm gear arrangement is drivably coupled with the drive gear.

13. The actuating device of claim 1, wherein the shaft further comprises a locking ring coupled to the shaft, wherein the locking ring comprises the plurality of detent teeth.

14. An actuating device for a component, the actuating device comprising:
a shaft comprising a plurality of detent teeth, the shaft defining a longitudinal axis along a length thereof;
a retaining ring disposed around the shaft, the retaining ring comprising a plurality of protrusions configured to engage with the shaft;
a housing movably disposed around the shaft and coupled to the component, the housing comprising a plurality of tabs disposed on an inner surface of the housing;
a clutch ring received within the housing and movably disposed around the shaft, the clutch ring comprising a plurality of cam surfaces, a plurality of engagement grooves and a plurality of detent recesses, wherein each tab of the housing is configured to be at least partially and removably received within a corresponding engagement groove from the plurality of engagement grooves in order to rotationally lock the housing relative to the clutch ring, wherein each detent recess is configured to releasably engage with a corresponding detent tooth from the plurality of detent teeth in order to rotationally lock the clutch ring relative to the shaft;
a first spring disposed between the retaining ring and the clutch ring;
a second spring disposed between the clutch ring and the housing, wherein the plate spring is coupled to the housing;
a drive gear received within the housing and movably disposed around the shaft, the drive gear comprising a plurality of cam followers, wherein each cam follower is configured to travel on a corresponding cam surface from the plurality of cam surfaces; and
a motor drive drivably coupled to the drive gear, wherein the motor drive is engaged with the housing such that rotational and translational movements of the motor drive causes corresponding rotational and translational movements of the housing;
wherein, in a first position of the housing, each tab is at least partially received within the corresponding engagement groove and each detent recess is engaged with the corresponding detent tooth; and
wherein the motor drive is configured to provide power output in a first rotational direction at the first position of the housing, wherein, in response to power output in the first rotational direction, the drive gear rotates with respect to the shaft such that each cam follower travels on the corresponding cam surface causing the motor drive and the housing to move away from the clutch ring along the longitudinal axis, wherein a movement of the housing away from the clutch ring causes each tab to disengage from the corresponding engagement groove and allows rotation of the housing along with the motor drive to a second position.

15. The actuating device of claim 14, wherein the clutch ring further comprises a plurality of hard stops corresponding to the plurality of cam surfaces, each hard stop being disposed between two adjacent cam surfaces, wherein each cam follower is configured to engage with a corresponding hard stop from the plurality of hard stops, and wherein, the motor drive is configured to cease power output in response to the engagement of each cam follower with the corresponding hard stop.

16. The actuating device of claim 15, wherein the clutch ring further comprises a plurality of soft detents corresponding to the plurality of cam surfaces, wherein each soft detent is disposed on the corresponding cam surface proximal to the corresponding hard stop.

17. The actuating device of claim 14, wherein the clutch ring further comprises a plurality of engagement ledges corresponding to the plurality of engagement grooves, each engagement ledge being disposed adjacent to the corresponding engagement groove.

18. An actuating device for a component movable with respect to a vehicle between an unfolded position and a folded position, the actuating device comprising:
- a shaft comprising a plurality of detent teeth, the shaft defining a longitudinal axis along a length thereof, wherein the shaft is coupled to the vehicle;
- a housing movably disposed around the shaft and coupled to the component, the housing comprising a plurality of tabs disposed on an inner surface of the housing;
- a clutch ring received within the housing and movably disposed around the shaft, the clutch ring comprising a plurality of cam surfaces, a plurality of engagement grooves and a plurality of detent recesses, wherein each tab of the housing is configured to be at least partially and removably received within a corresponding engagement groove from the plurality of engagement grooves in order to rotationally lock the housing relative to the clutch ring, wherein each detent recess is configured to releasably engage with a corresponding detent tooth from the plurality of detent teeth in order to rotationally lock the clutch ring relative to the shaft;
- a drive gear received within the housing and movably disposed around the shaft, the drive gear comprising a plurality of cam followers, wherein each cam follower is configured to travel on a corresponding cam surface from the plurality of cam surfaces; and
- a motor drive drivably coupled to the drive gear, wherein the motor drive is engaged with the housing such that rotational and translational movements of the motor drive causes corresponding rotational and translational movements of the housing;

wherein, in a first position of the housing, each tab is at least partially received within the corresponding engagement groove and each detent recess is engaged with the corresponding detent tooth, the first position of the housing corresponding to the unfolded position of the component; and wherein the motor drive is configured to provide power output in a first rotational direction at the first position of the housing, wherein, in response to power output in the first rotational direction, the drive gear rotates with respect to the shaft such that each cam follower travels on the corresponding cam surface causing the motor drive and the housing to move away from the clutch ring along the longitudinal axis, wherein a movement of the housing away from the clutch ring causes each tab to disengage from the corresponding engagement groove and allows rotation of the housing along with the motor drive to a second position, the second position of the housing corresponding to the folded position of the component.

19. The actuating device of claim 18, wherein the clutch ring further comprises a plurality of hard stops corresponding to the plurality of cam surfaces, each hard stop being disposed between two adjacent cam surfaces, wherein each cam follower is configured to engage with a corresponding hard stop from the plurality of hard stops, and wherein, the motor drive is configured to cease power output in response to the engagement of each cam follower with the corresponding hard stop.

20. The actuating device of claim 19, wherein the clutch ring further comprises a plurality of soft detents corresponding to the plurality of cam surfaces, each soft detent being disposed on the corresponding cam surface proximal to the corresponding hard stop.

* * * * *